(12) United States Patent
Tano et al.

(10) Patent No.: US 8,442,575 B2
(45) Date of Patent: May 14, 2013

(54) RADIO COMMUNICATION METHOD AND RADIO BASE STATION

(75) Inventors: Masatoshi Tano, Yokohama (JP); Kugo Morita, Yokohama (JP)

(73) Assignee: Kyocera Corporation, Kyoto (JP)

( * ) Notice: Subject to any disclaimer, the term of this patent is extended or adjusted under 35 U.S.C. 154(b) by 888 days.

(21) Appl. No.: 12/439,150

(22) PCT Filed: Aug. 29, 2007

(86) PCT No.: PCT/JP2007/066813
§ 371 (c)(1),
(2), (4) Date: Oct. 8, 2009

(87) PCT Pub. No.: WO2008/026662
PCT Pub. Date: Mar. 6, 2008

(65) Prior Publication Data
US 2010/0029318 A1    Feb. 4, 2010

(30) Foreign Application Priority Data
Aug. 30, 2006    (JP) ................................. 2006-233803

(51) Int. Cl.
*H04B 7/00*    (2006.01)

(52) U.S. Cl.
USPC ............................. 455/522; 370/330; 370/352

(58) Field of Classification Search .................... 455/522
See application file for complete search history.

(56) References Cited

U.S. PATENT DOCUMENTS

| | | | |
|---|---|---|---|
| 4,165,493 A * | 8/1979 | Harrington ................. 330/207 P |
| 5,592,131 A * | 1/1997 | Labreche et al. ............. 332/103 |
| 5,761,622 A * | 6/1998 | Priest ............................. 455/522 |
| 5,860,057 A * | 1/1999 | Ishida et al. .................. 455/12.1 |
| 5,987,333 A * | 11/1999 | Sole ............................... 455/522 |
| 6,230,022 B1 | 5/2001 | Sakoda et al. ................. 455/522 |
| 6,574,456 B2 * | 6/2003 | Hamabe ....................... 455/63.3 |
| 6,819,706 B1 * | 11/2004 | Lim ............................... 375/130 |
| 6,823,187 B2 * | 11/2004 | Hamabe ........................ 455/454 |
| 7,016,320 B1 * | 3/2006 | Petersson et al. ............ 370/331 |
| 7,039,410 B2 * | 5/2006 | Jovanovic ..................... 455/444 |
| 7,116,982 B2 * | 10/2006 | Balachandran et al. ... 455/452.2 |
| 7,260,138 B1 * | 8/2007 | Nakagawa .................... 375/146 |
| 7,340,006 B2 * | 3/2008 | Yun et al. ...................... 375/296 |
| 7,450,355 B2 * | 11/2008 | Ochiai ............................ 361/31 |
| 7,616,677 B2 * | 11/2009 | Koo et al. ..................... 375/141 |
| 7,742,444 B2 * | 6/2010 | Mese et al. .................... 370/318 |

(Continued)

FOREIGN PATENT DOCUMENTS

| | | |
|---|---|---|
| JP | 05-048521 | 2/1993 |
| JP | 11-196043 | 7/1999 |
| JP | 11-341555 | 12/1999 |

*Primary Examiner* — Hai Nguyen
(74) *Attorney, Agent, or Firm* — DLA Piper LLP (US)

(57) ABSTRACT

The present invention is summarized as a radio communication method including the steps of: calculating a transmission power difference between transmission powers of a first carrier and a second carrier; determining whether or not the transmission power difference exceeds a threshold set on the basis of a maximum transmission power difference allowable between the first carrier and the second carrier; and when the transmission power difference exceeds the threshold set on the basis of the maximum transmission power difference, assigning a first time frame used for transmitting reverse link data by using the first carrier and a second time frame used for transmitting reveres link data by using the second carrier in a manner that the two times frames do not overlap with each other on the time axis.

4 Claims, 13 Drawing Sheets

U.S. PATENT DOCUMENTS

| | | | | |
|---|---|---|---|---|
| 7,885,608 B2* | 2/2011 | Nilsson et al. | 455/69 |
| 7,894,380 B2* | 2/2011 | Sun et al. | 370/320 |
| 7,917,165 B2* | 3/2011 | Sun et al. | 455/522 |
| 7,929,472 B2* | 4/2011 | Gu et al. | 370/310 |
| 7,941,174 B2* | 5/2011 | Breuer et al. | 455/522 |
| 7,970,407 B2* | 6/2011 | Vincent | 455/446 |
| 8,077,654 B2* | 12/2011 | Sutivong et al. | 370/328 |
| 8,116,351 B2* | 2/2012 | Koo et al. | 375/141 |
| 8,145,251 B2* | 3/2012 | Love et al. | 455/522 |
| 8,175,062 B2* | 5/2012 | Halfmann et al. | 370/332 |
| 8,179,876 B2* | 5/2012 | Agrawal et al. | 370/343 |
| 8,200,272 B2* | 6/2012 | Han | 455/522 |
| 8,238,923 B2* | 8/2012 | Julian et al. | 455/450 |
| 8,285,319 B2* | 10/2012 | Shin et al. | 455/522 |
| 8,290,530 B2* | 10/2012 | Morita et al. | 455/522 |
| 8,320,495 B2* | 11/2012 | Kashiwase et al. | 375/295 |
| 8,345,636 B2* | 1/2013 | Ofuji et al. | 370/332 |
| 8,346,178 B2* | 1/2013 | Morita | 455/69 |
| 2002/0111163 A1 | 8/2002 | Hamabe | 455/425 |
| 2003/0103469 A1* | 6/2003 | Setty et al. | 370/280 |
| 2004/0066795 A1* | 4/2004 | Zhang | 370/442 |
| 2004/0171352 A1* | 9/2004 | Maeda et al. | 455/67.13 |
| 2004/0171401 A1* | 9/2004 | Balachandran et al. | 455/522 |
| 2005/0201308 A1* | 9/2005 | Sekiya et al. | 370/310 |
| 2006/0030323 A1* | 2/2006 | Ode et al. | 455/436 |
| 2006/0034364 A1* | 2/2006 | Breitzmann et al. | 375/238 |
| 2006/0062507 A1* | 3/2006 | Yanik et al. | 385/5 |
| 2007/0097962 A1* | 5/2007 | Yoon et al. | 370/352 |
| 2008/0194281 A1* | 8/2008 | Sun et al. | 455/522 |
| 2009/0029653 A1* | 1/2009 | Halfmann et al. | 455/69 |
| 2009/0040975 A1* | 2/2009 | Vijayan et al. | 370/329 |
| 2009/0122757 A1* | 5/2009 | Cave et al. | 370/329 |
| 2009/0149140 A1* | 6/2009 | Borran et al. | 455/114.2 |
| 2010/0056169 A1* | 3/2010 | Koo et al. | 455/450 |
| 2010/0067474 A1* | 3/2010 | Vijayan et al. | 370/329 |
| 2011/0282999 A1* | 11/2011 | Teague et al. | 709/226 |

* cited by examiner

FIG. 5
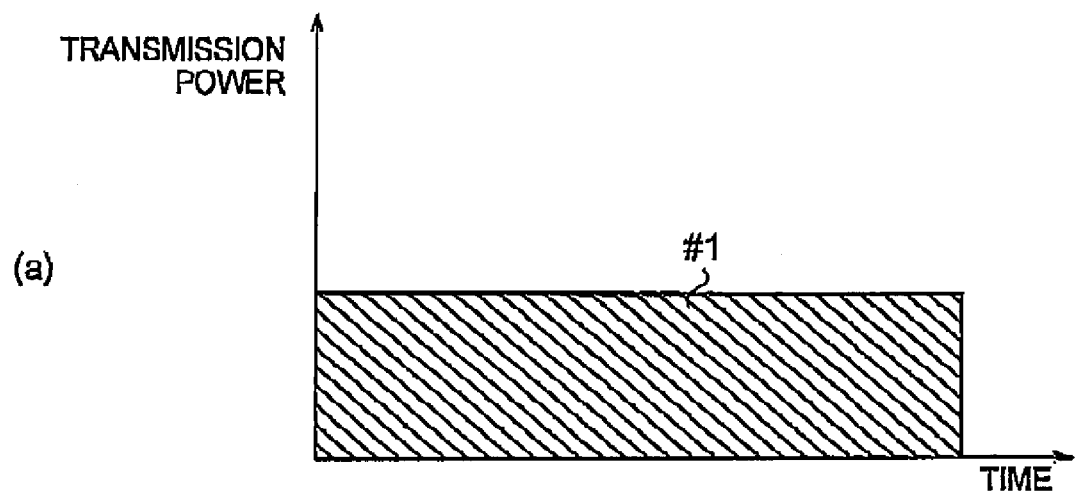
(a)
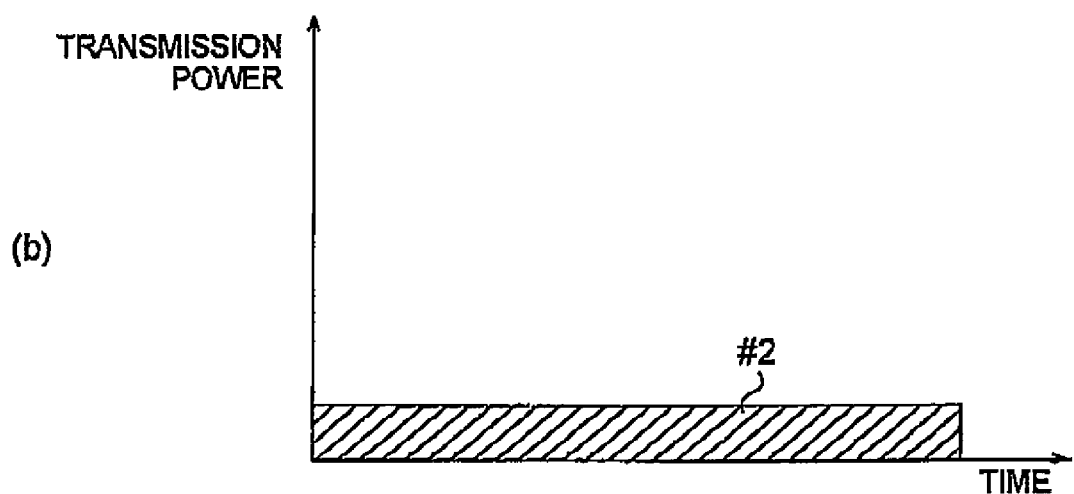
(b)

FIG. 6
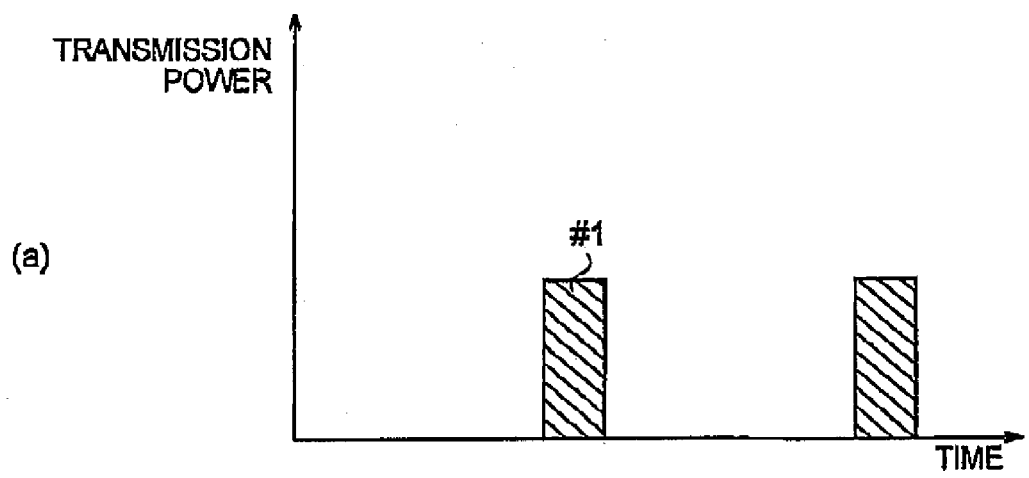
(a)
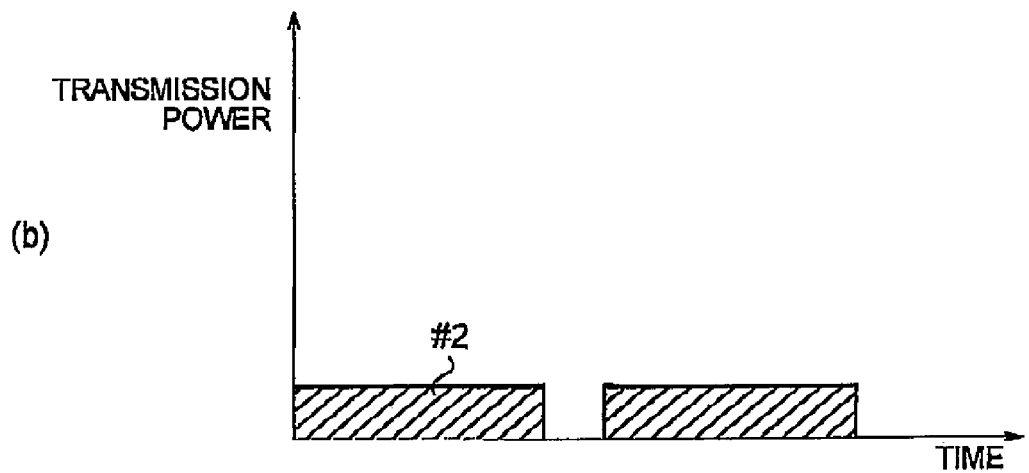
(b)

RADIO COMMUNICATION METHOD AND RADIO BASE STATION

CROSS-REFERENCE TO THE RELATED APPLICATIONS

This application is a national stage of international application No. PCT/JP2007/066813 filed Aug. 29, 2007, which also claims the benefit of priority under 35 UCS 119 to Japanese Patent Application No. 2006-233803 filed Aug. 30, 2006, the entire contents of which are incorporated herein by reference.

TECHNICAL FIELD

The present invention relates to a radio communication method in reverse link by multicarrier using multiple carriers, and to a radio base station connected to a radio communication terminal by multicarrier.

BACKGROUND ART

In recent years, as applications, such as moving images or games, to be handled have been diversified and sophisticated, the data transmission rate in a mobile communication system has been strongly demanded to be speeded up. With such a background, the Third Generation Partnership Project 2 (3GPP2), for example, defines a scheme for implementing high speed data transmissions by using multiple carriers bundled in a upper layer (so-called multicarrier).

In the case of multicarrier, a radio communication terminal (Access Terminal) generally employs a configuration in which multiple carriers are transmitted, by use of a single radio communication circuit, in view of downsizing, reduction in manufacturing coat or the like. Thus, in order to reduce interference between adjacent carriers that are adjacent to each other with a predetermined frequency interval (1.25 MHz interval), it is provided that a transmission power difference between adjacent carriers should be within a predetermined threshold (MaxRLTxPwrDiff, 15 dB, for example) (Non-patent document 1, for example).

Non-patent document 1: "cdma2000 High Rate Packet Data Air Interface 3GPP2 C.S0024-B Version 1.0", 3GPP2, June 2006

DISCLOSURE OF THE INVENTION

As described above, 3GPP2 provides that a transmission power difference between adjacent carriers be controlled to be within a predetermined threshold (MaxRLTxPwrDiff). In some cases, however, the transmission power difference cannot be maintained within the predetermined threshold under some communication conditions between a radio communication terminal and a radio base station (Access Network).

For example, when a radio communication terminal moves away from a first radio base station that is currently performing communications by use of a first carrier and simultaneously moves toward a second radio base station that is currently performing communications by use of a second carrier adjacent to the first carrier with a predetermined frequency interval, the radio communication terminal needs to increase the transmission power of the first carrier to maintain communications with the first radio base station using the first carrier, in addition, as the radio communication terminal comes closes to the second radio base station, the radio communication terminal reduces the transmission power of the second carrier.

In this way, in some cases, the radio communication terminal may not be able to maintain the transmission power difference within the predetermined threshold to continue communications currently being performed with the first radio base station and the second radio base station.

Hence, the present invention was made in light of such the circumstances, and an objective of the present invention is to provide a radio communication method and a radio base station that are capable of maintaining communications by multicarrier, while controlling interference between adjacent carriers which are adjacent to each other with a predetermined frequency interval.

One characteristic of the present invention is summarized as a radio communication method in reverse link by multicarrier using at least a first carrier and a second carrier that is adjacent to the first carrier with a predetermined frequency interval. The method includes the steps of: acquiring a transmission power valve of the first carrier from a radio communication terminal connected via the first carrier; acquiring a transmission power value of the second carrier from a radio communication terminal connected via the second carrier; calculating a transmission power difference between the transmission power values of the first carrier and the second carrier; determining whether the transmission power difference exceeds a threshold set on the basis of a maximum transmission power difference allowable between the first carrier and the second carrier; assigning a first time frame used for transmitting reverse link data by using the first carrier and a second time frame used for transmitting reveres link data by using the second carrier in a manner that the two time frames do not overlap with each other on the time axis, in a case where the transmission power difference exceeds the threshold set on the basis of the maximum transmission power difference; notifying the radio communication terminal connected via the first carrier, of the first time frame; and notifying the radio communication terminal connected via the second carrier, of the second time frame.

According to the aforementioned characteristic, in a case where a transmission power difference exceeds a threshold set on the basis of a maximum transmission power difference, a first time frame used for transmitting reverse link data by using a first carrier and a second time frame used for transmitting reverse link data by using a second carrier are assigned in a manner that the two time frames do not overlap with each other on the time axis.

Thus, communications by multicarrier can be maintained while interference between adjacent carriers that are adjacent to each other with a predetermined frequency interval is controlled.

One characteristic of the present invention is summarized in that, in the aforementioned characteristic, the transmission power difference is calculated in a predetermined cycle in the step of calculating the transmission power difference, and the method further includes the step of determining whether the transmission power difference is increasing, on the basis of the transmission power differences calculated in the predetermined cycle, and, in the step of assigning the first time frame and the second time frame, the first and second time frames are assigned in a manner that the two tine frames do not overlap with each other in the time axis, in a case where the transmission power difference is determined as increasing.

One characteristic of the present invention is summarized as a radio base station connected to a radio communication terminal by multicarrier using at least a first carrier and a second carrier that is adjacent to the first carrier with a predetermined frequency interval. The radio base station includes: an acquisition unit (receiver 110) configured to acquire a transmission power value of the first carrier from a radio communication terminal connected via the first carrier and a transmission power value of the second carrier from a radio communication terminal connected via the second carrier; a transmission power difference calculator (transmission power difference calculator 120) configured to calculate a transmission power difference between the transmission power values of the first carrier and the second carrier; a transmission power difference determination unit (transmission power difference calculator 120) configured to determine whether or not the transmission power difference calculated by the transmission power difference calculator exceeds a threshold set on the basis of a maximum, transmission power difference allowable between the first carrier and the second carrier; an assignment unit (transmission setting information generator 150) configured to assign a first time frame used for transmitting reverse link data by using the first carrier and a second time frames used for transmitting reverse link data by using the second carrier in a manner that the two time frames do not overlap with each other in a time axis, in a case where the transmission power difference determination unit determines that the transmission power difference exceeds the threshold set on the basis of the maximum transmission power difference; and a notification unit (transmitter 160) configured to notify the radio communication terminal connected via the first carrier of the first time frame and the radio communication terminal connected via the second carrier of the second time frame.

One characteristic of the present invention is summarized in that, in the aforementioned characteristic, the transmission power difference calculator calculates the transmission power difference in a predetermined cycle, and the radio base station further includes a power difference tendency determination unit (transmission power difference determination unit 170) configured to determine whether the transmission power difference is increasing, on the basis of the transmission power differences calculated by the transmission power difference calculator in the predetermined cycle, and the assignment unit assigns the first and second time frames in a manner that the two time frames do not overlap with each other in the time axis, in a case where the power difference tendency determination unit determines that the transmission power difference is increasing.

According to the characteristics of the present invention it is possible to provide a radio communication method and a radio base station capable of maintaining communications by multicarrier while controlling interference between adjacent carriers that are adjacent to each other with a predetermined frequency interval.

BRIEF DESCRIPTION OF THE DRAWINGS

FIG. 5 is a diagram showing a reverse link data transmission method according to the first embodiment of the present invention (Method 1).

FIG. 6 is a diagram showing a reverse link data transmission method according to the first embodiment of the present invention (Method 2).

BEST MODE FOR CARRYING OUT THE INVENTION

Figure 1:
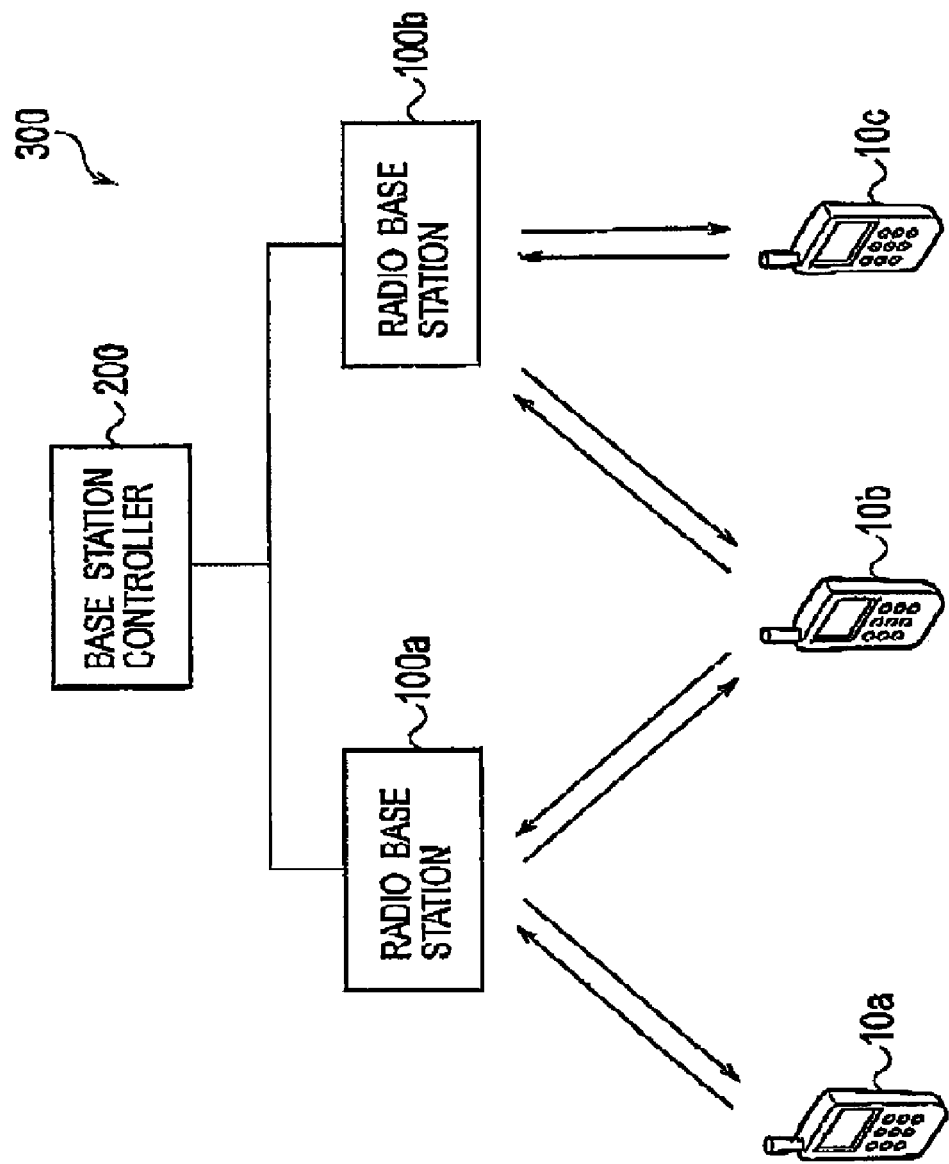
FIG. 1 is a diagram showing an overall schematic configuration of a communication system 300 according to a first embodiment of the present invention.

Next, embodiments of the present invention will be described. In the following description of the drawings, a same or similar reference numeral is given to a same or similar part. However, it should be noted that the drawings are schematic and the ratio of each dimension differs from actual ratio.

Thus, specific dimensions and the like are to be determined by referring to the following description. In addition, a relationship or a ratio of mutual dimensions may differ among the drawings, as a matter of course.

First Embodiment (Overall Schematic Configuration of Communication System)

An overall schematic configuration of a communication system according to a first embodiment of the present invention will be described hereinafter with reference to the drawings. FIG. 1 shows an overall schematic configuration of a communication system 300 according to the first embodiment of the present invention.

As shown in FIG. 1, the communication system 300 includes multiple radio communication terminals 10 (a radio communication terminal 10a to a radio communication terminal 10c)/multiple radio base stations 100 (a radio base station 100a and a radio base station 100b), and a base station controller 200.

A radio communication terminal 10 transmits reverse link data to a radio base station 100 by using a reverse link frequency band assigned for transmitting the reverse link data. Specifically, the reverse link frequency band is divided into multiple carriers. The radio communication terminal 10 transmits the reverse link data to the base radio station 100 by using the multiple carriers bundled in an upper layer (multicarrier).

In addition, a radio communication terminal 10 receives forward link data from a radio base station 100 by using a forward link frequency band assigned for transmitting the forward link data. Specifically, the forward link frequency band is divided into multiple carriers. The radio communication terminal 10 receives the forward link data from the radio base station 100 by using the multiple carriers bundled in an upper layer (multicarrier).

Note that, as in the case of the radio communication terminal 10a or the radio communication terminal 10c, the radio communication terminal 10 may communicate with a single radio base station 100. In addition, the radio communication terminal 10 may communicate with multiple radio base stations 100 as in the case of the radio communication terminal 10b.

The radio base station 100 receives the reverse link data from the radio communication terminal 10 by using the reverse link frequency band assigned fox receiving the reverse link data. The radio base station 100 also transmits the forward link data to the radio communication terminals 10 by using the forward link frequency band assigned for transmitting the forward link data.

The base station controller 200 controls communications made between the radio communication terminals 10 and the radio base stations 100. The base station controller 200 performs operation such as handoff in which the radio communication terminal 10 switches a radio base station 100 for communicating therewith to another.

Note that, in the communication system 300, the radio communication terminal 10 performs open loop control for controlling transmission power of reverse link data on the basis of reception power of forward link data received from the radio base station 100. The radio communication terminal 10 also performs closed loop control for controlling transmission power of reverse link data on the basis of power control information received from the radio base station 100. The power control information heroin is information that the radio base station 100 generates on the basis of reception quality (for example, signal to interference ratio (SIR)) of the reverse link data received from the radio communication terminal 10.

(Reverse Link Frequency Band)

Figure 2:
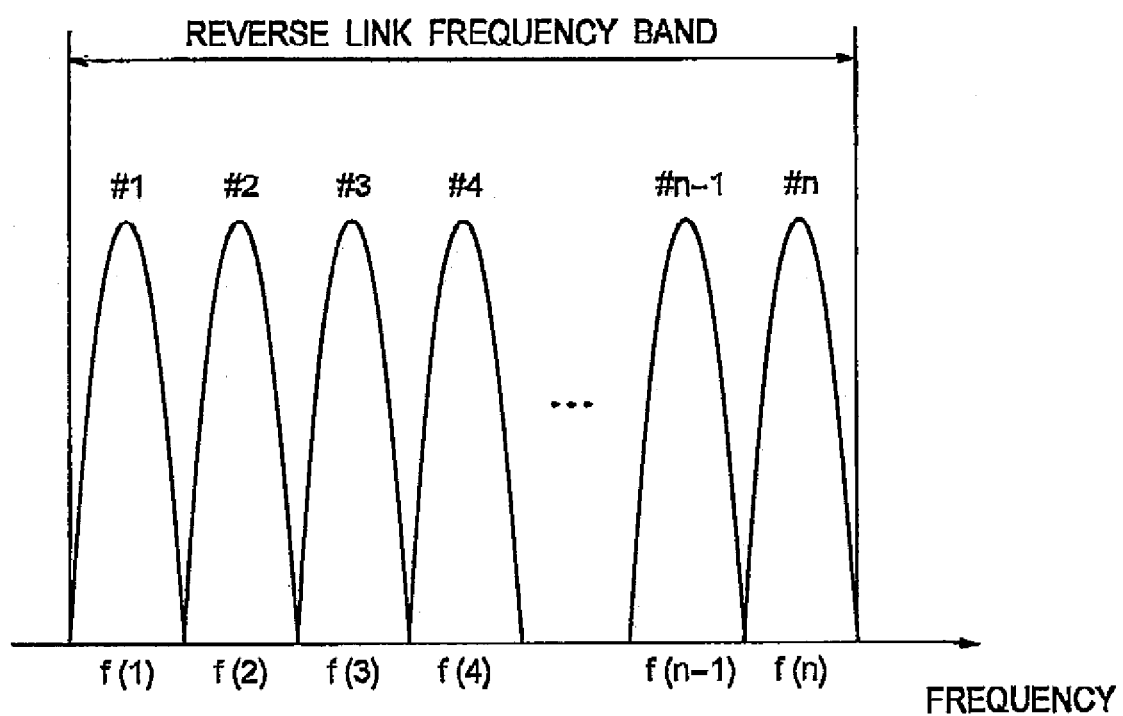
FIG. 2 is a diagram showing a reverse link frequency band according to the first embodiment of the present invention.

A reverse link frequency band according to the first embodiment of the present invention will be described hereinafter with reference to the drawings. FIG. 2 shows the reverse link frequency band according to the first embodiment of the present invention.

As shown in FIG. 2, the reverse link frequency band is divided into multiple carriers (carrier #1 to carrier #n). In addition, center frequencies of carriers are f(1) to f(n), respectively. The center frequencies of the respective carriers are adjacent to each other being spaced apart at a predetermined frequency interval (e.g., 1.25 MHz). Two carriers having their center frequencies being adjacent to each other will be hereinafter referred to as adjacent carriers.

(Configuration of Radio Communication Terminals)

Figure 3:
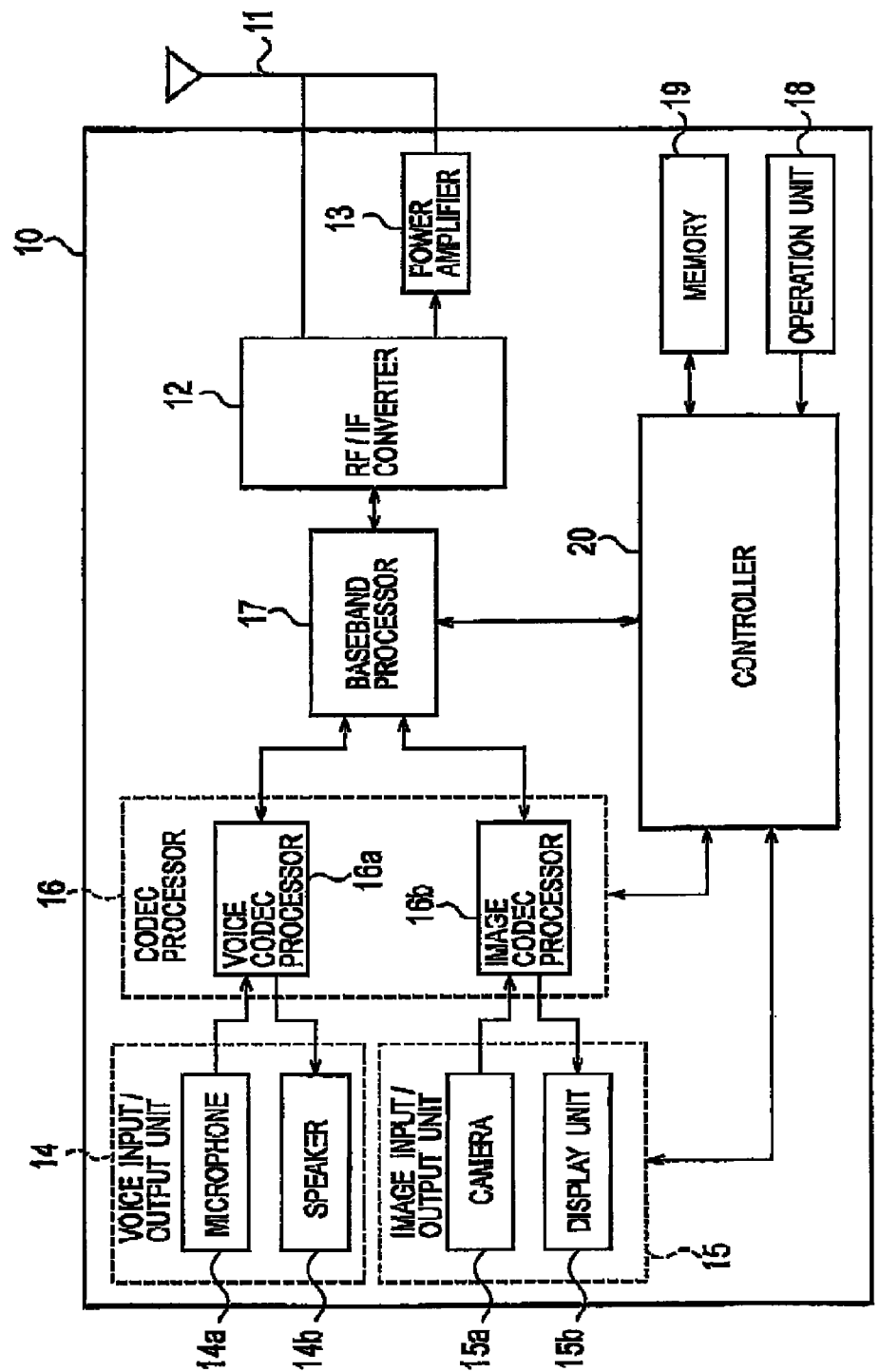
FIG. 3 is a functional block configuration diagram of a radio communication terminal 10 according to the first embodiment of the present invention.

A configuration of the radio communication terminal according to the first embodiment of the present invention will be described hereinafter with reference to the drawings. FIG. 3 is a functional block configuration diagram showing the radio communication terminal 10 according to the first embodiment of the present invention. Since the radio communication terminals 10a to 10c have similar configurations, they will be collectively referred to as a radio communication terminal 10 in the following description.

As shown in FIG. 3, the radio communication terminal 10 includes an antenna 11, an RF/IF converter 12, a power amplifier 13, a voice input/output unit 14, an image input/output unit 1b, a codec processor IS, a baseband processor 17, an operation unit 18, a memory 19 and a controller 20.

The antenna 11 receives a signal (a reception signal) transmitted by the radio base stations 100. The antenna 11 also transmits a signal (a transmission signal) to the radio base stations 100.

The RF/IF converter 12 converts a frequency (Radio Frequency (RF)) of a reception signal received by the antenna 11 into a frequency (Intermediate Frequency (IF)) to be processed by the baseband processor 17. The RF/IF converter 12 also converts the frequency (IF) of a transmission signal acquired from the baseband processor 17 into the frequency (RF) to be used in radio communications. In addition, the RF/IF converter 12 inputs the transmission signal converted into the radio frequency (RF) to the power amplifier 13.

The power amplifier 13 amplifies the transmission signal acquired from the RF/IF converter 12. The amplified transmission signal is inputted to the antenna 11.

The voice input/output unit 14 has a microphone 14a for collecting voice and a speaker 14b for outputting voice. The microphone 14a inputs a voice signal into the codec processor 16 on the basis of the collected voice. The speaker 14b outputs voice on the basis of the voice signal acquired from the codec processor 16.

The image input/output unit 15 includes a camera 15a for capturing an object, and a display unit 15b for displaying characters or images, etc. The camera 15a inputs an image signal to the codec processor 16 on the basis of captured images (still images and moving images). The display unit 15b displays images on the basis of the image signal acquired from the codec processor 16. The display unit 15b also displays characters inputted through the operation unit 18.

The codec processor 16 includes: a voice codec processor 16a for encoding and decoding a voice signal according to a predetermined encoding scheme (EVRC (Enhanced Variable Rate Codec), AMR (Advanced Multi Rate Codec) or G.729 compliant with ITU-T, for example); and an image codec processor 16b for encoding and decoding an image signal according to a predetermined encoding scheme (MPEG-4 etc, for example).

The voice codec processor 16a encodes a voice signal acquired from the voice input/output unit 14. The voice codec processor 16a also decodes a voice signal acquired from the baseband processor 17. The image codec processor 16b encodes an image signal acquired from the image input/output unit 15. The image codec processor 16b also decodes an image signal acquired from the baseband processor 17.

The baseband processor 17 modulates a transmission signal or demodulates a reception signal according to a predetermined modulation scheme (QPSK or 16QAM), or the like. Specifically, the baseband processor 17 modulates a baseband signal such as a voice signal or an image signal acquired from the codec processor 16. The modulated baseband signal (transmission signal) is inputted into the RF/IF converter 12. The baseband processor 17 also demodulates a reception, signal acquired from the RF/IF converter 12. The demodulated reception signal (baseband signal) is inputted into the codec processor 16.

The baseband processor 17 modulates information generated by the controller 20. The modulated information (transmission signal) is inputted into the RF/IF converter 12. The baseband processor 17 also demodulates a reception signal acquired from the RF/IF converter 12. The demodulated reception signal is inputted into the controller 20.

The operation unit 18 includes a group of keys consisting of input keys for allowing characters, digits, or the like to be inputted, a response key for responding to incoming communications (receiving a call), or a calling key for calling (originating a call), etc. In addition, when each key is pressed, the operation unit 18 allows an input signal corresponding to the pressed key to be inputted to the controller 20.

The memory 19 stores a program for controlling operation of the radio communication terminal 10, various types of data such as history of originated/received calls, an address book, etc. The memory 19 is formed of a flash memory that is a nonvolatile semiconductor memory, or an SRAM (Static Random Access Memory) that is a volatile semiconductor memory, etc.

The controller 20 controls operation of the radio communication terminal 10 (the image input/output unit 15, the codec processor 16, the baseband processor 17, etc.) according to the program stored in the memory 19.

For example, the controller 20 controls a transmission power of reverse link data for each carrier. Specifically, the controller 20 controls the transmission power of the reverse link data on the basis of reception quality (SIR, for example) of forward link data received from the radio base station 100 to which the reverse link data is transmitted (open loop control).

The controller 20 also controls transmission a power of reverse link data on the basis of power control information received from the radio base station 100 to which reverse link data is transmitted (closed loop control). Note that, as described above, the power control information is information that the radio base station 100 generates on the basis of reception quality (SIR, for example) of the reverse link data. The power control information requests an increase or decrease of the transmission power for the reverse link data.

Furthermore, the controller 20 generates transmission power information (transmission power value) indicating a transmission power of reverse link data (carrier) that is determined by the open loop control and closed loop control. Note that the transmission power information (transmission power value) is transmitted to the radio base station 100 connected to the radio communication terminal 10 via the carrier.

Note that, hereinafter, a description will be given while citing a case where the radio communication terminal 10 is connected to one of the radio base stations by use of adjacent carriers (carrier #1 and carrier #2, for example) as an example. In addition, the transmission power information (transmission power values) includes information indicating transmission powers of the respective adjacent carriers.

(Configuration of Radio Base Station)

Figure 4:
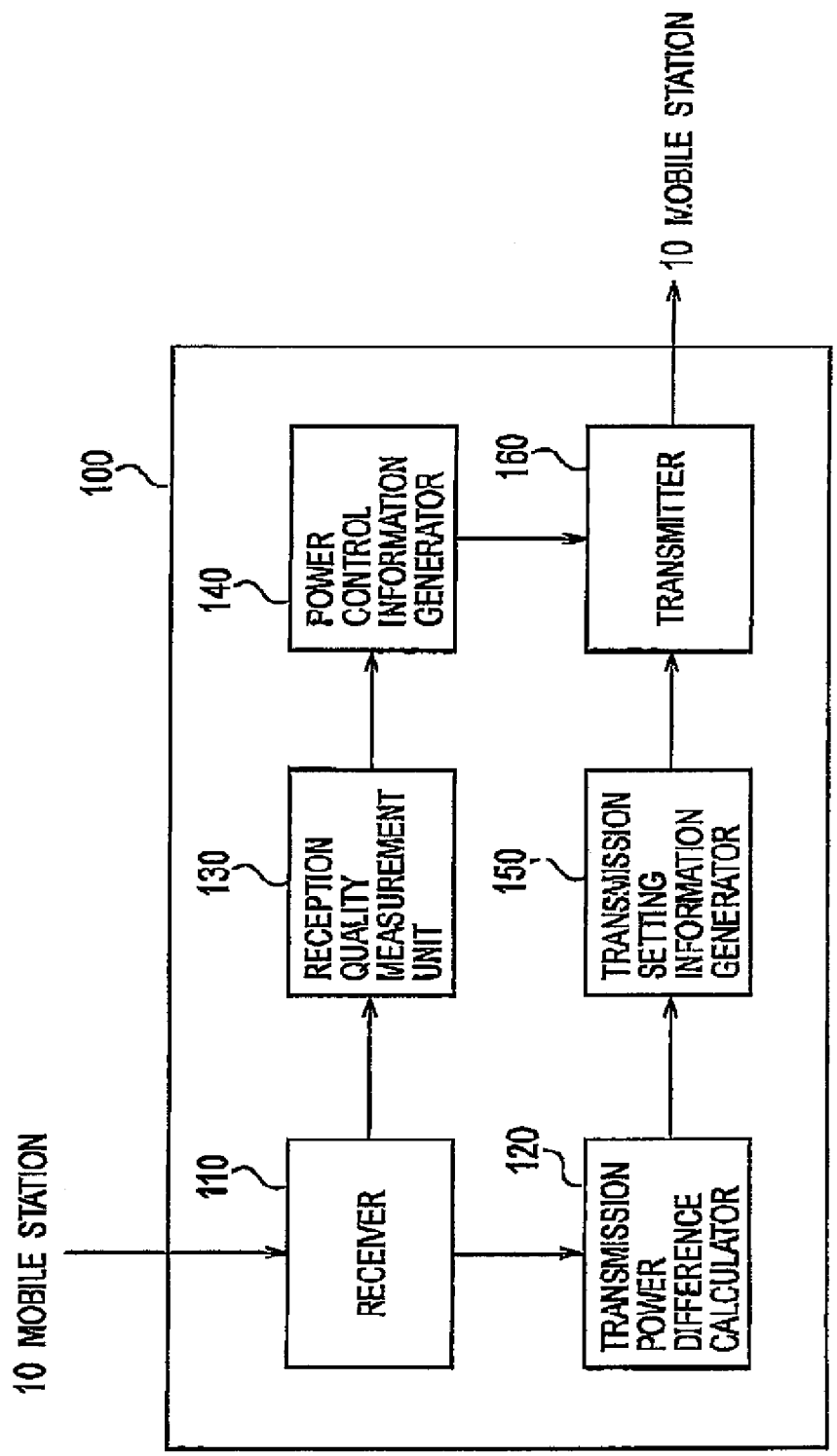
FIG. 4 is a functional block configuration diagram of a radio base station 100 according to the first embodiment of the present invention.

Hereinafter, a configuration of the radio base station according to the first embodiment of the present invents on will be described with reference to the drawings. FIG. 4 is a functional block configuration diagram showing the radio base station 100 according to the first embodiment of the present invention.

As shown in FIG. 4, the radio base, station 100 includes a receiver 110, a transmission power difference calculator 120, a reception quality measurement unit 130, a power control information generator 140, a transmission setting information generator 150 and a transmitter 160.

The receiver 110 receives reverse link data via a carrier from the radio communication terminal 10 connected to the radio base station 100 through the carrier. Subsequently, the receiver 110 inputs the reverse link data received from the radio communication terminal 10 to the reception quality measurement unit 130.

Furthermore, the receiver 110 receives transmission power information (transmission power values) of the carriers from the radio communication terminal 10 connected to the radio base station 100 via the carriers, subsequently, the receiver 110 inputs the transmission power information (transmission power values) received from the radio communication terminal 10 to the transmission power difference calculator 120.

The transmission power difference calculator 120 calculates a difference between the transmission powers of the adjacent carriers (hereinafter, a transmission power difference) on the basis of the transmission power information (transmission power values) acquired from the receiver 110. Moreover, the transmission power difference calculator 120 determines whether or not the transmission power difference between the adjacent carriers exceeds a threshold set on the basis of a maximum transmission power difference (MaxRLTxPwrDiff) allowable between the adjacent carriers. When the transmission power difference between the adjacent carriers exceeds the threshold set on the basis of the maximum transmission power difference, the transmission power difference calculator 120 notifies the power control information generator 140 that the transmission power difference between the adjacent carriers has exceeded the threshold set on the basis of the maximum transmission power difference.

Here, the threshold to be set on the basis of a maximum transmission power difference may be equal to the maximum transmission power difference itself, or may be a value smaller than the maximum transmission power difference (such as a value obtained by multiplying the maximum transmission power difference by a predetermined ratio (0.9)).

The reception quality measurement unit 130 measures a reception quality (SIR, for example) of the reverse link data acquired from the receiver 110. Moreover, the reception quality measurement unit 130 inputs the measured reception quality of the reverse link data (carrier) to the power control information generator 140.

The power control information generator 140 determines whether to provide an instruction to increase the transmission power of the reverse link data (carrier) or to provide an instruction to decrease the transmission power of the reverse link data (carrier) on the basis of the reception quality of the reverse link data acquired from the reception quality measurement unit 130. Subsequently, the power control information generator 140 generates power control information being an instruction to increase or decrease the transmission power of the reverse link data (carrier) on the basis of a judgment result based on the reception quality of the reverse link data, the power control information generated for each carrier.

The transmission setting information generator 150 generates transmission setting information indicating a transmission setting for reverse link data using adjacent carriers. Here, the transmission setting information includes a normal setting and an intermittent transmission. The normal setting is a transmission setting for transmitting reverse link data by using adjacent carriers without dividing the reverse link data on the time axis. The intermittent transmission is a transmission setting for transmitting reverse link data by using adjacent carriers in a manner that transmissions of the reverse link data using the adjacent carriers do not overlap with each other on the time axis.

Specifically, when the transmission setting information generator 150 is notified that the transmission power difference between the adjacent carriers exceeds a threshold set on the basis of a maximum transmission power difference, the transmission setting information, generator 150 assigns a time frame to each of the adjacent carriers in a manner that the times frames used for transmitting reverse link data by using the respective adjacent carriers do not overlap with each other. Subsequently, the transmission setting information generator 150 generates transmission setting information to provide an instruction to transmit the reverse link data by use of the intermittent transmission. In a case where the instruction to transmit the reverse link data by use of the intermittent transmission is provided, the transmission setting information includes information indicating a time frame assigned to each of the adjacent carriers.

On the other hand, the transmission setting information generator 150 cancels the intermittent transmission when the transmission power difference between the adjacent carriers decreases to a value not greater than the threshold set on the basis of the maximum transmission power difference. Next, the transmission setting information generator 150 generates transmission setting information to provide an instruction to transmit the reverse link data by use of the normal transmission.

The transmitter 160 transmits the power control information generated by the power control information generator 140 to the radio communication terminal 10. Moreover, the transmitter 160 transmits the transmission setting information generated by the transmission setting information generator 150 to the radio communication terminal 10.

Note that in a case where the radio communication terminal 10 connected via one of the adjacent carriers and the radio communication terminal 10 connected via the other one of the adjacent carriers are different, the transmitter 160 individually transmits transmission setting information to each of the radio communication terminals 10, as a matter of course.

In this case, the transmission setting information corresponding to the radio communication terminal 10 connected to the one of the adjacent carriers may only include information indicating a time frame used for transmitting the reverse link, data via the one of the adjacent carriers, in a case where the instruction to transmit the reverse link data by use of the intermittent transmission is to be provided. Likewise, the transmission setting information corresponding to the radio communication terminal 10 connected to the other one of the adjacent carriers may only include information indicating a time frame used for transmitting the reverse link data via the other one of the adjacent carriers, in a case where the instruction to transmit the reverse link data by use of the intermittent transmission is to be provided.

Hereinafter, a reverse link data transmission method will be described in detail with reference to the drawings. FIGS. 5 and 6 show details of the reverse link data transmission method according to the first embodiment of the present invention.

As shown in FIGS. 5(*a*) and 5(*b*) when a transmission power difference between adjacent carriers does not exceed a threshold set on the basis of a maximum transmission power difference, reverse link data using the carrier #1 and reverse link data using the carrier #2 are multiplexed and transmitted (in other words, a time frame used for transmitting the reverse link data by using the carrier #1 and a time frame used for transmitting the reverse link data by using the carrier #2 overlap with each other in the time axis).

Specifically, the radio base station 100 transmits transmission setting information to provide an instruction to transmit reverse link data with the carrier #1 by use of the normal transmission to the radio communication terminal 10 connected to the radio base station 100 via the carrier #1. Likewise, the radio base station 100 transmits transmission setting information to provide an instruction to transmit reverse link data with the carrier #2 by use of the normal transmission to the radio communication terminal 10 connected to the radio base station 100 via the carrier #2.

As shown in FIGS. 6(*a*) and 6(*b*), when a transmission power difference between adjacent carriers exceeds a threshold set on the basis of a maximum transmission power difference, reverse link data using the carrier #1 and reverse link data using the carrier #2 are transmitted in divided time frames so as not to overlap with each other on the time axis.

Specifically, the radio base station 100 assigns a time frame to each of the carrier #1 and the carrier #2 in a manner that the time frame used for transmitting reverse link data by using the carrier #1 and the time frame used for transmitting reverse link data by using the carrier #2 do not overlap with each other. Subsequently, the radio base station 100 transmits transmission setting information to provide an instruction to transmit the reverse link data by use of the intermittent transmission to the radio communication terminal 10 connected to the radio base station 100 via the carrier #1, the transmission setting information including information indicating the time frame assigned to the carrier #1, Likewise, the radio base station 100 transmits transmission setting information to provide an instruction to transmit the reverse link data by use of the intermittent transmission to the radio communication terminal 10 connected to the radio base station 100 via the carrier #2, the transmission setting information including information indicating the time frame assigned to the carrier #2.

(Operation of Radio Communication Terminal)

Figure 7:
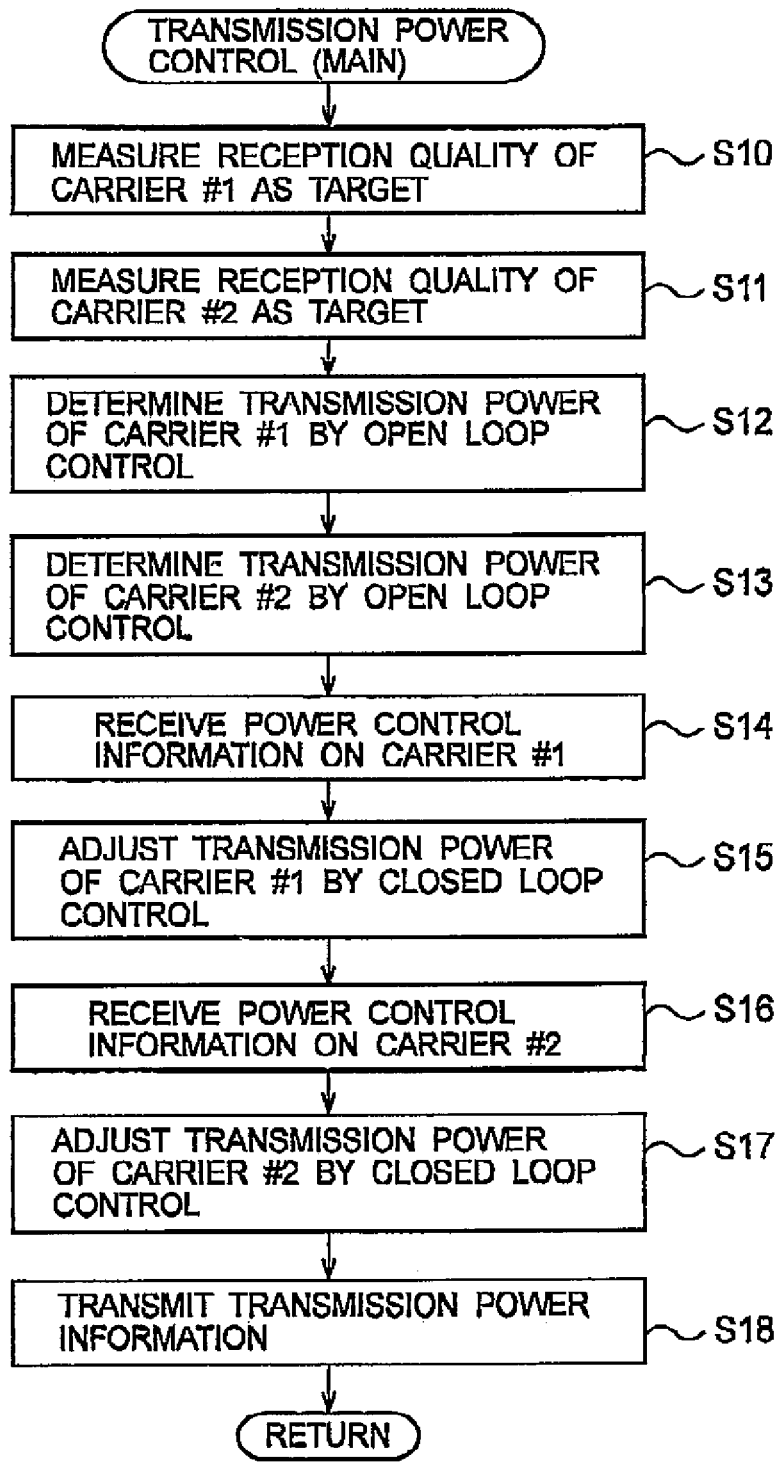
FIG. 7 is a flowchart showing operation of the radio communication terminal 10 according to the first embodiment of the present invention.

The operation of the radio communication terminal according to the first embodiment of the present invention will be described hereinafter with reference to the drawings. FIG. 7 is a flowchart of the operation of the radio communication terminal 10 according to the first embodiment of the present invention. Note that the main processing of controlling transmission power is repeatedly performed in a predetermined cycle.

Hereinafter, the case where adjacent carriers are the carrier #1 and the carrier #2 will be described as an example. In addition, the radio communication terminal 10 transmits reverse link data to one of the radio base stations by using the carrier #1 and the carrier #2.

As shown in FIG. 7, in step 10, the radio communication terminal 10 measures reception quality of forward link data as the carrier #1 being the target. Specifically, the radio communication terminal 10 measures the reception quality of forward link data received from the radio base station 100 to which reverse link data is to be transmitted by using the carrier #1.

In step 11, the radio communication terminal 10 measures reception quality of forward link data as the carrier #2 being the target. Specifically, the radio communication terminal 10 measures the reception quality of forward link data received from the radio base station 100 to which reverse link data is to be transmitted by using the carrier #2.

In step 12, the radio communication terminal 10 determines a transmission power of the reverse link data to be transmitted by using the carrier #1, through the open loop control. Specifically, the radio communication terminal 10 determines the transmission power of the reverse link data to be transmitted by using the carrier #1, on the basis of the reception quality measured in step 10.

In step 13, the radio communication terminal 10 determines a transmission power of the reverse link data to be transmitted by using the carrier #2, through the open loop control. Specifically, the radio communication terminal 10 determines the transmission power of the reverse link data to be transmitted by using the carrier #2, on the basis of the reception quality measured in step 11.

In step 14, the radio communication terminal 10 receives power control information for the carrier #1. Specifically, the radio communication terminal 10 receives the power control information from the radio base station 100 to which reverse link data is transmitted by using the carrier #1. Note that the power control information is information that the radio base station 100 generates on the basis of the reception quality of the reverse link data transmitted by using the carrier #1.

In step 15, the radio communication terminal 10 adjusts the transmission power of the reverse link data to be transmitted by using the carrier #1, through the closed loop control. Specifically, the radio communication terminal 10 adjusts the transmission power of the reverse link data determined in step 12, on the basis of the power control information received in step 14.

Specifically, the radio communication terminal 10 transmits the reverse link data by using the carrier #1 with the transmission power determined through the open loop control and the closed loop control.

In step 16, the radio communication terminal 10 receives power control information for the carrier #2. Specifically, the radio communication terminal 10 receives the power control information from the radio base station 100 to which reverse link data is transmitted by using the carrier #2. Note that the power control information is information that the radio base station 100 generates on the basis of the reception quality of the reverse link data transmitted by using the carrier #2.

In step 17, the radio communication terminal 10 adjusts the transmission power of the reverse link data to be transmitted by using the carrier #2, through the closed loop control. Specifically, the radio communication terminal 10 adjusts the transmission power of the reverse link data determined in step 13, on the basis of the power control information received in step 16.

Specifically, the radio communication terminal 10 transmits the reverse link data by using the carrier #2 with the transmission power determined through the open loop control and the closed loop control.

In step 18, the radio communication terminal 10 transmits transmission power information indicating the transmission power of the carrier #1 (transmission power value) and transmission power information indicating the transmission power of the carrier #2 (transmission power value) to the radio base station 100.

(Operation of Radio Base Station)

Figure 8:
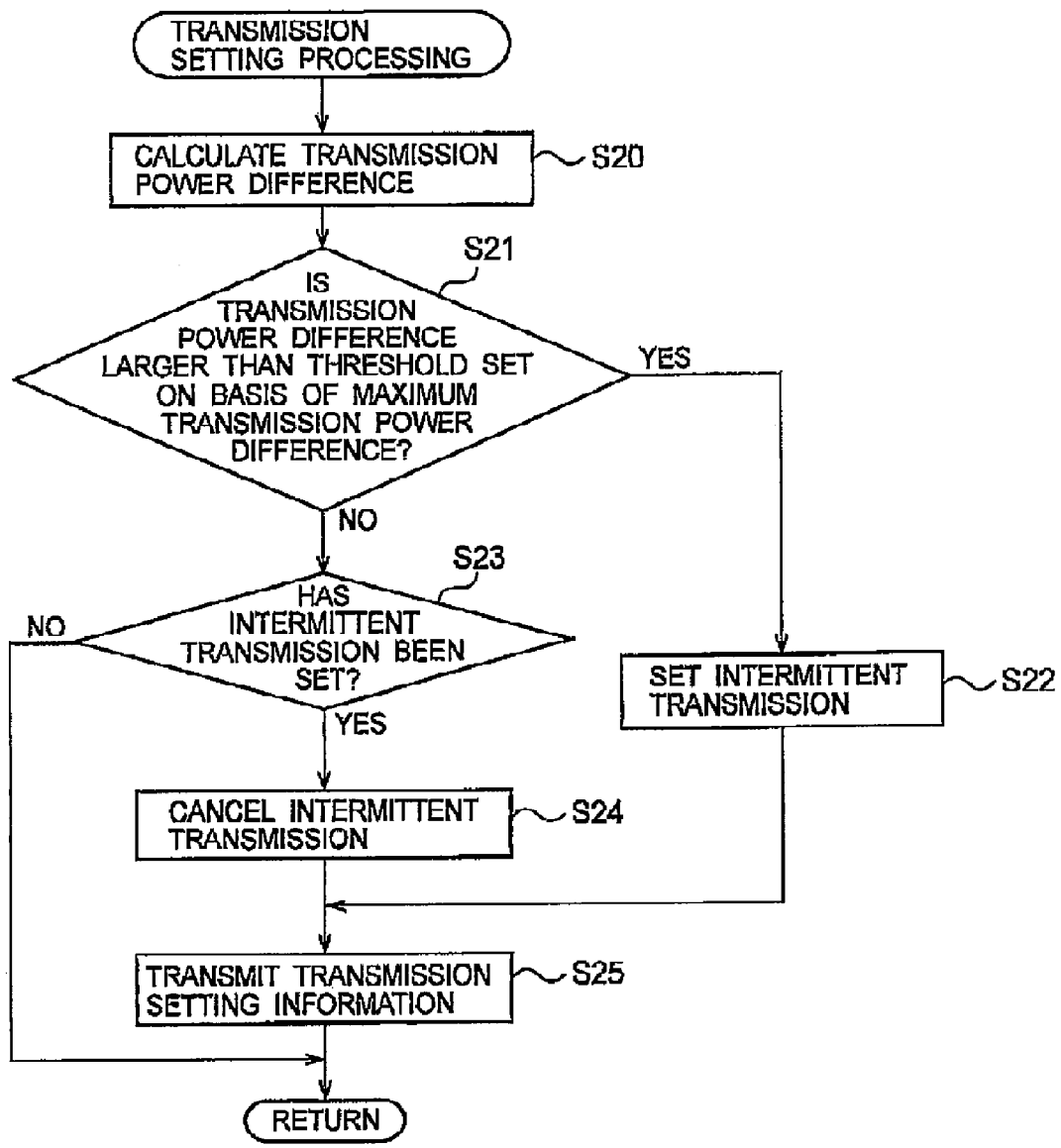
FIG. 8 is a flowchart showing operation of the radio base station 100 according to the first embodiment of the present invention.

The operation of the radio base station according to the first embodiment of the present invention will be described hereinafter with reference to the drawings. FIG. 8 is a flowchart showing the operation of the radio base station 100 according to the first embodiment of the present invention.

As shown in FIG. 8, in step 20, the radio base station 100 calculates a difference between the transmission powers of the adjacent carriers (the carrier #1 and the carrier #2) for the reverse link data (transmission power difference) on the basis of the transmission power information (transmission power values) received from the radio communication terminal 10.

In step 21, the radio base station 100 determines whether or not the transmission power difference between the adjacent carriers exceeds a threshold that is set on the basis of a maximum transmission power difference (MaxRLTxP-wrDiff). The radio base station 100 proceeds to the processing in step 22 when the transmission power difference between the adjacent carriers exceeds the threshold set on the basis of the maximum transmission power difference, on the other hand, when the transmission power difference between the adjacent carriers does not exceed the threshold set on the basis of the maximum transmission power difference, the radio base station 100 moves to the processing in step 23.

Here, as described previously, the threshold to be set on the basis of a maximum transmission power difference may be equal to the maximum transmission power difference, or may be a value smaller than the maximum transmission power difference (such as a value obtained by multiplying the maximum transmission power difference by a predetermined ratio (0.9)).

In step 22, the radio base station 100 generates transmission setting information to provide an instruction to transmit reverse link data with the adjacent carriers by use of the intermittent transmission. Specifically, the radio base station 100 assigns a time frame to each of the adjacent carriers #1 and #2 in a manner that the time frame used for transmitting reverse link data by using the carrier #1 and the time frame used for transmitting reverse link data by using the carrier #2 do not overlap with each other. Subsequently, the radio base station 100 generates transmission setting information to provide an instruction to transmit the reverse link data by use of the intermittent transmission for the carrier #1, the transmission setting information including information indicating the time frame assigned to the carrier #1. Likewise, the radio base station 100 generates transmission setting information to provide an instruction to transmit the reverse link data by use of the intermittent transmission for the carrier #2, the transmission setting information including information indicating the time frame assigned to the carrier #2.

In step 23, the radio base station 100 determines whether or not the radio base station 100 has instructed the radio communication terminal 10 to transmit reverse link data by use of the intermittent transmission, through the transmission setting information. In a case where the radio base station 100 has provided an instruction to transmit reverse link data by use of the intermittent transmission, the radio base station 100 moves to the processing in step 24. On the other hand, in a case where the radio base station 100 has not provided the instruction to transmit reverse link data by use of the intermittent transmission, the radio base station 100 terminates the transmission setting processing.

In step 24, the radio base station 100 cancels the intermittent transmission and generates transmission setting information to provide an instruction to transmit reverse link data by use of the normal transmission, specifically, the radio base station 100 generates transmission setting information to provide an instruction to transmit the reverse link data with the carrier #1 by use of the normal transmission for the carrier #1. Likewise, the radio base station 100 generates transmission setting information to provide an instruction to transmit the reverse link data with the carrier #2 by use of the normal transmission for the carrier #2.

In step 25, the radio base station 100 transmits the transmission setting information generated in step 22 or step 24 to the radio communication terminal 10. specifically, the radio base station 100 transmits the transmission setting information generated for the carrier #1 to the radio communication terminal 10 connected to the radio base station 100 via the carrier #1. Likewise, the radio base station 100 transmits the transmission setting information generated for the carrier #2 to the radio communication terminal 10 connected to the radio base station 100 via the carrier #2.

(Action and Effect)

With the radio base station 100 according to the first embodiment of the present invention, the power control information generator 140 generates transmission setting information in a case where a transmission power difference between the adjacent carriers exceeds a threshold set on the basis of a maximum transmission power difference (MaxRLTxP-wrDiff). The transmission setting information generated in this case is to provide an instruction to transmit reverse, link data by use of divided time frames in a manner that transmissions of the reverse link data using adjacent carriers do not overlap with each other in the time axis (in other words, to transmit reverse link data with adjacent carriers by use of the intermittent transmission). Then, the transmitter 160 transmits the transmission setting, information generated by the power control information generator 140 to the radio communication terminal 10 connected via adjacent carriers.

Thus, communications by multicarrier can be maintained while interference between adjacent carriers which are adjacent to each other with a predetermined frequency interval is controlled.

Second Embodiment

A second embodiment of the present invention will be described hereinafter. In the following description, differences between the first embodiment described above and the second embodiment will be mainly described.

Specifically, in the first embodiment described above, the radio base station 100 instructs the radio communication terminal 10 to transmit reverse link data by use of divided time frames in a manner that transmissions of reverse link data using adjacent carriers do not overlap with each other on the time axis (in other words, to transmit reverse link data with adjacent carriers by use of the intermittent transmission), in a case where a transmission power difference between the adjacent carriers exceeds a threshold set on the basis of a maximum transmission power difference.

Different from this, in the second embodiment, the radio base station 100 determines whether or not a transmission power difference between adjacent carriers is increasing. Then the radio base station 100 instructs the radio communication terminal 10 to transmit reverse link data with the adjacent carriers by use of the intermittent transmission, in a case where the transmission power difference between the adjacent carriers is increasing, and also where the transmission power difference between the adjacent carriers exceeds a threshold set on the basis of a maximum transmission power difference.

(Configuration of Radio Base Station)

Figure 9:
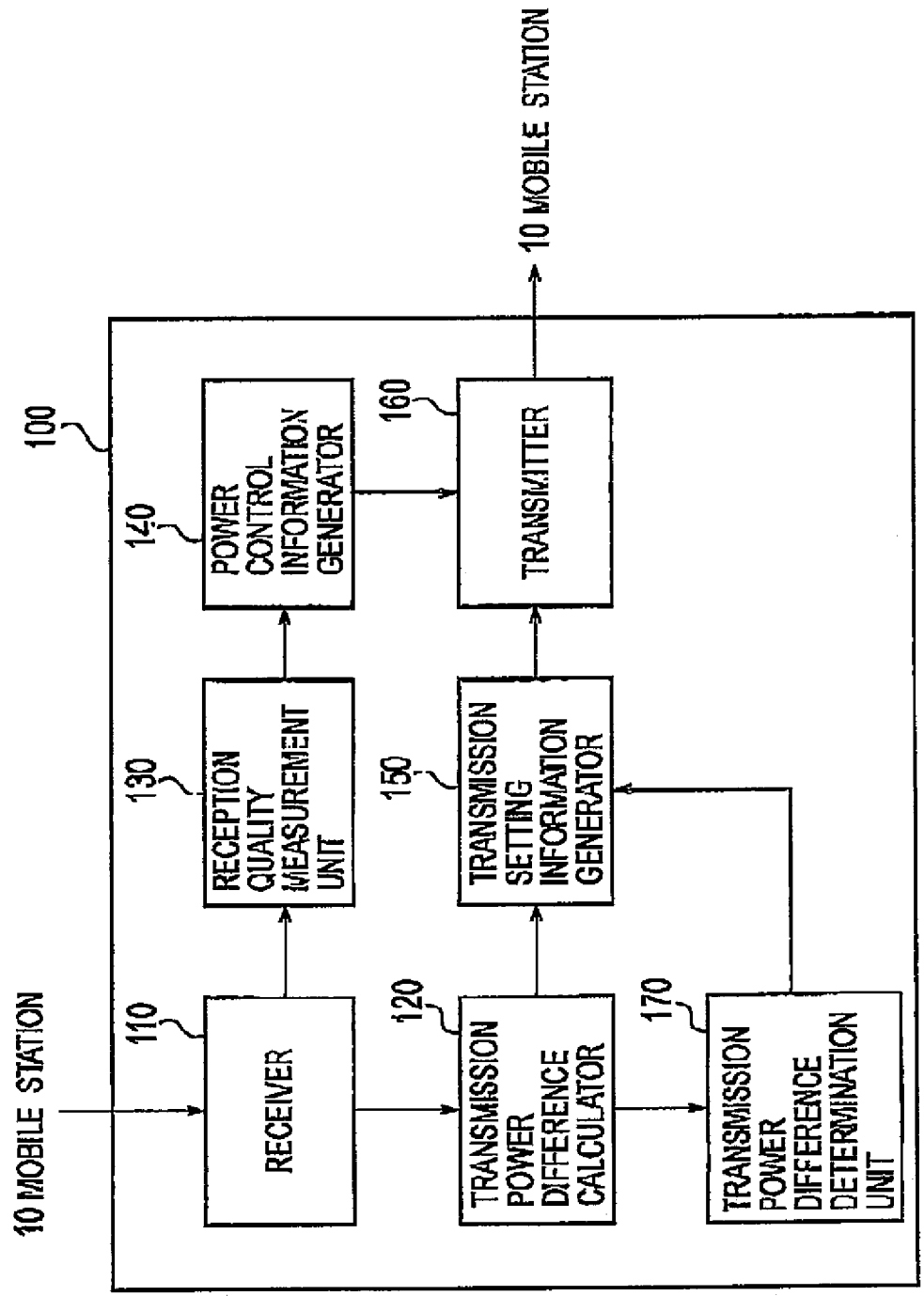
FIG. 9 is a functional block configuration diagram of a radio base station 100 according to a second embodiment of the present invention.

A configuration of the radio base station according to the second embodiment of the present invention will be described hereinafter with reference to the drawings. FIG. 9 is a functional block configuration diagram showing the radio base station 100 according to the second embodiment of the present invention, it should be noted that in FIG. 9, similar reference numerals are assigned to the configuration similar to FIG. 4.

As shown in FIG. 9, the radio base station 100 includes a transmission power difference determination unit 170 in addition to the receiver 110, the transmission power difference calculator 120, the reception quality measurement unit 130, the power control information generator 140 and the transmission setting information generator 150.

The transmission power difference calculator 120 calculates a transmission power difference between adjacent carrier in a predetermined cycle (cycle in which the receiver 110 receives transmission power information, for example).

The transmission power difference determination unit 170 determines whether or not the transmission power difference between the adjacent carriers is increasing, the difference calculated by the transmission power difference calculator 120 in the predetermined cycle. Specifically, on the basis of the transmission power of the reverse link data, the transmission power difference determination unit 170 calculates an expression of an estimated curve (hereinafter referred to as an estimated curve expression) for each of the adjacent carriers, the estimated curve expression showing a state in which the transmission power of the reverse link date changes on the tine axis. Subsequently, the transmission power difference determination unit 170 determines whether or not the difference in values calculated by each of the estimated curve expressions (hereinafter referred to as an estimated curve difference) at a predetermined time exceeds an estimated curve difference threshold for a predetermined period. When the estimated curve difference between the adjacent carriers exceeds the estimated curve difference threshold for the predetermined period, the transmission power difference determination unit 170 notifies the power control information generator 140 that the estimated curve difference between the adjacent carriers exceeds the estimated curve difference threshold for the predetermined period.

Figure 10:
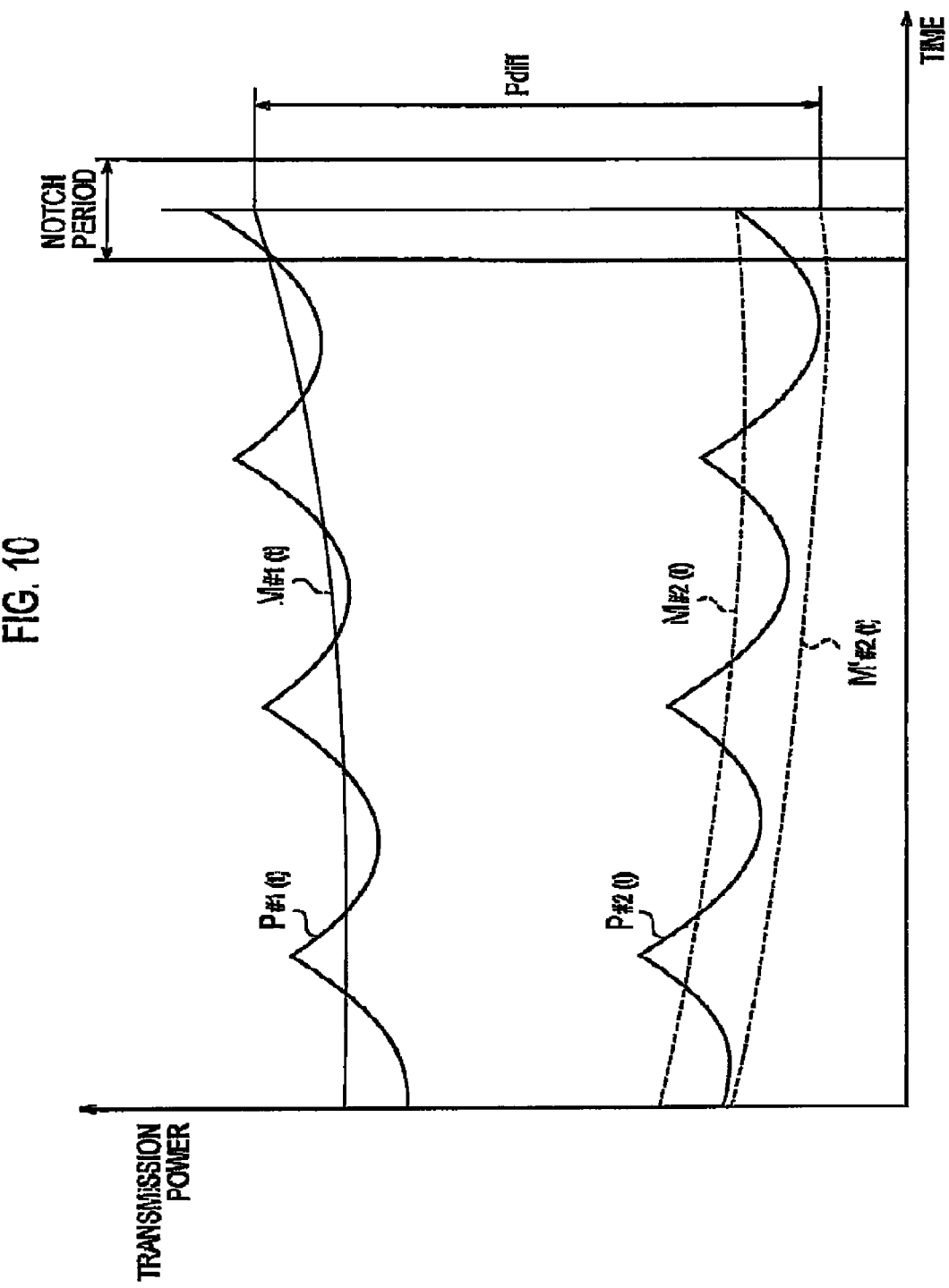
FIG. 10 is a diagram for describing calculation of an estimated curve difference (a difference in values calculated by an estimated curve expression of each carrier) according to the second embodiment of the present invention.

For example, using the case where the adjacent carriers are the carrier #1 and the carrier #2 as an example, the procedure for calculating an estimated curve difference between the carrier #1 and the carrier #2 will be described with references to FIG. 10. Hereinafter, considered is the case where the transmission power of the carrier #1 is larger than that of the carrier #2.

Note that a notch period is determined by notch intervals calculated on the basis of reception strength or reception quality (SIR). Specifically, the notch period includes a notch interval before the peak point of a transmission power estimation curve and a notch interval after the peak point thereof. Here, the radio base station 100 instructs the radio communication terminal 10 to transmit reverse link data with the adjacent carriers by use of the intermittent transmission in a case where the estimated curve difference between the adjacent carriers exceeds the estimated curve difference threshold for the predetermined period during the notch period.

Specifically, when the transmission power of the #1 at time t is set as "$P_{\#1}(t)$", an estimated curve expression "$M_{\#1}(t)$" of the carrier #1 is calculated by the following expression (1) where $\alpha$ is a coefficient corresponding to the carrier #1.

[Formula 1]

$$M_{\#1}(t) = \alpha \times P_{\#1}(t) + (1-\alpha) \times M_{\#1}(t-\Delta t) \qquad (1)$$

On the other hand, when the transmission power of the carrier #2 at the time t is set as "$P_{\#2}(t)$", an estimated curve expression "$M_{\#2}(t)$" of the #2 is calculated by the following expression (2) where $\beta$ is a coefficient corresponding to the carrier #2.

[Formula 2]

$$M_{\#2}(t) = \beta \times P_{\#2}(t) + (1-\beta) \times M_{\#2}(t-\Delta t) \qquad (2)$$

Furthermore, for the carrier #2 having a lower transmission power, a lower estimated curve expression "$M'_{\#2}(t)$" of the carrier #2 is calculated by the following expression (3).

[Formula 3]

$$M'_{\#2}(t) = M_{\#2}(t) - \max\{M_{\#2}(t+\Delta t) - P_{\#2}(t+\Delta t)\} \qquad (3)$$

In addition, at the time t, a difference (estimated curve difference "$P_{diff}$") between a value calculated by the estimated curve expression of the carrier #1 and a value calculated by the lower estimated curve expression of the carrier #2 is calculated by the following expression (4).

[Formula 4]

$$P_{diff} = M_{\#1}(t) - M'_{\#2}(t) \qquad \text{Expression (4)}$$

Subsequently, the transmission power difference determination unit 170 46 determines whether or not the estimated curve difference "$P_{diff}$" calculated by the expression (1) to the expression (4) exceeds the estimated curve difference threshold ($P_{thresh}$) for a predetermined period.

It is needless to say that an estimated curve difference "$P_{diff}$" may simply be a difference between a value calculated by the estimated curve expression "$M_{\#1}(t)$" and a value calculated by the estimated curve expression "$M_{\#2}(t)$", not a difference between a value calculated by the estimated curve expression "$M_{\#1}(t)$" and a value calculated by the lower estimated curve expression "$M'_{\#2}(t)$".

Note that the transmission power difference determination unit 170 may determine whether or not the estimated curve difference "$P_{diff}$" exceeds the estimated curve difference threshold ($P_{thresh}$) during the notch period.

When notified that an estimated curve difference between adjacent carriers exceeds an estimated curve difference threshold for a predetermined period and that a transmission power difference between the adjacent carriers exceeds a threshold set on the basis of a maximum transmission power difference, the transmission setting information generator 150 generates transmission setting information to instruct the radio communication terminal 10 to transmit reverse link data with the adjacent carriers by use of the intermittent transmission.

(Operation of Radio Base Station)

Figure 11:
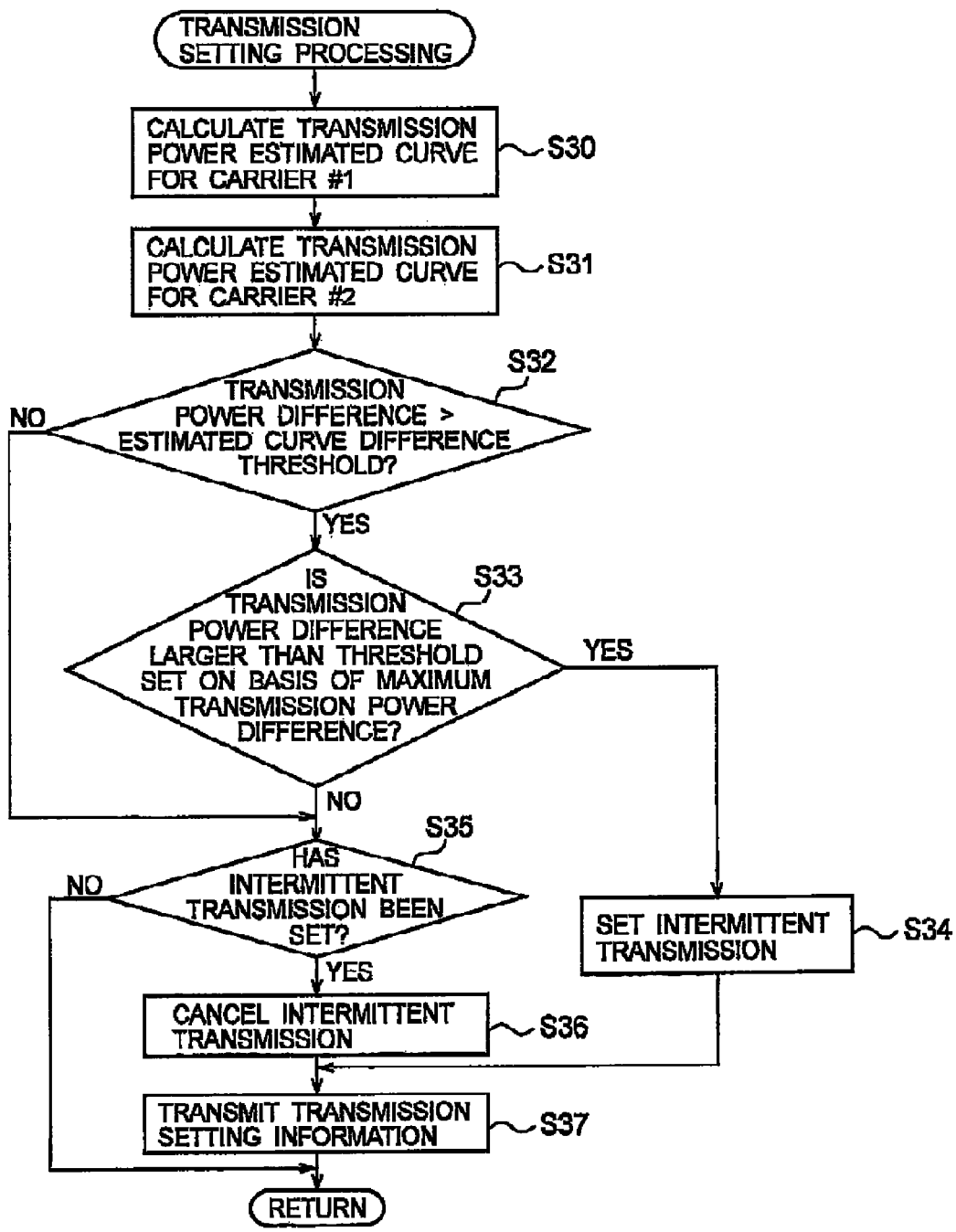
FIG. 11 is a flowchart showing operation of the radio base station 100 according to the second embodiment of the present invention.

The operation of the radio base station according to the second embodiment of the present invention will be described hereinafter with reference to the drawings. FIG. 11 is a flowchart of the operation of the radio base station 100 according to the second embodiment of the present invention. Note that the transmission setting processing shown in FIG. 11 is performed instead of the aforementioned transmission setting processing shown in FIG. 8.

Hereinafter, as is the case of the first embodiment as described above, the case where the adjacent carriers are the carrier #1 and the carrier #2 will be described as an example. In addition, the radio communication terminal 10 is assumed to transmit reverse link data to one of the radio base stations 100 by using the carrier #1 and the carrier #2. Furthermore, the transmission power of the carrier #1 is assumed to be larger than that of the carrier #2.

As shown in FIG. 11, in step 30, the radio base station 100 receives transmission power information (transmission power value) indicating the transmission power of the carrier #1 from the radio communication terminal 10. Subsequently, the radio base station 100 calculates an estimated curve expression of the carrier #1 on the basis of the transmission power of the reverse link data transmitted via the carrier #1 with larger transmission power.

In step 31, the radio base station 100 receives transmission power information (transmission power value) indicating the transmission power of the carrier #2 from the radio communication terminal 10. Subsequently, the radio base station 100 calculates an estimated curve expression (or a lower estimated curve expression) of the carrier #2 on the basis of the transmission power of the reverse link data transmitted via the carrier #2 with lower transmission power.

In step 32, based on the estimated curve expression of the carrier #1 calculated in step 30 and the estimated curve expression (or the lower estimated curve expression) of the carrier #2 calculated in step 31, the radio base station 100 determines whether or not a transmission power difference between the carrier #1 and the carrier #2 exceeds the estimated curve difference threshold. Specifically, the radio base station 100 calculates a difference (estimated curve difference) between a value calculated by the estimated curve expression of the carrier #1 and a value calculated by the estimated curve expression (or the lower estimated curve expression) of the carrier #2. Subsequently, the radio base station 100 determines whether or not the estimated curve difference exceeds an estimated curve difference threshold for a predetermined period.

When the radio base station 100 determines that the estimated curve difference exceeds the estimated curve difference threshold for the predetermined period, the radio base station 100 proceeds to the processing of step 33. On the other hand, when the radio base station 100 determines that the estimated curve difference does not exceed the estimated curve difference threshold for the predetermined period, the radio base station 100 proceeds to the processing of step 35.

In step 33, the radio base station 100 determines whether or not the transmission power difference between the carrier #1 and the carrier #2 exceeds a threshold set on the basis of a maximum transmission power difference. When the transmission power difference exceeds the threshold set on the basis of the maximum transmission power difference, the radio base station 100 proceeds to the processing of step 34. When the transmission power difference does not exceed the threshold set on the basis of the maximum transmission power difference, the radio base station 100 proceeds to the processing in step 35.

In step 34, the radio base station 100 generates transmission setting information to provide an instruction to transmit reverse link data with the adjacent carriers by use of the intermittent transmission. Specifically, the radio base station 100 assigns a time frame to each of the adjacent carriers #1 and #2 in a manner that the time frame used for transmitting reverse link data by using the carrier #1 and the time frame used for transmitting reverse link data by using the carrier #2 do not overlap with each other. Subsequently, the radio base station 100 generates transmission setting information for the carrier #1, the transmission power information including information indicating the time frame assigned to the carrier #1, and providing the instruction to transmit reverse link data by use of the intermittent transmission. Likewise, the radio base station 100 generates transmission setting information for the carrier #2, the transmission power information including information, indicating the time frame assigned to the carrier #2, and providing an instruction to transmit reverse link data by use of the intermittent transmission.

In step 35, the radio base station 100 determines whether or not the radio base station 100 has instructed the radio communication terminal 10 to transmit reverse link data by use of the intermittent transmission, through the transmission setting information. When the radio base station 100 has provided the instruction to transmit reverse link data by use of the intermittent transmission, the radio base station 100 moves to the processing of step 36. On the other hand, when the radio base station 100 has not provided the instruction to transmit reverse link data by use of the intermittent transmission, the radio base station 100 terminates the transmission setting processing.

In step 36, the radio base station 100 cancels the intermittent transmission, and generates transmission setting information to provide an instruction to transmit reverse link data by use or the normal transmission. Specifically, the radio base station 100 generates transmission setting information for the carrier #1, the information providing an instruction to transmit the reverse link data with the carrier #1 by use of the normal transmission. Likewise, the radio base station 100 generates transmission setting information for the carrier #2, the information providing an instruction to transmit the reverse link data with the carrier #2 by use of the normal transmission.

In step 37, the radio base station 100 transmits the transmission setting information generated in step 34 or step 36 to the radio communication terminal 10. Specifically, the radio base station 100 transmits the transmission setting information generated for the carrier #1 to the radio communication terminal 10 connecting to the radio base station 100 via the carrier #1. Likewise, the radio base station 100 transmits the transmission setting information generated for the carrier #2 to the radio communication terminal 10 connecting to the radio base station 100 via the carrier #2.

(Action and Effect)

With the radio base station 100 according to the second embodiment of the present invention, the power control information generator 140 instructs the radio communication terminal 10 to transmit reverse link data by use of divided time frames in a manner that transmissions of reverse link data using adjacent carriers do not overlap with each other on the time axis (in other words, to transmit reverse link data with adjacent carriers by use of the intermittent transmission). The power control information generator 140 provides this instruction not simply in a case where a transmission power difference between the adjacent carriers exceeds a threshold set on the basis of a maximum transmission power difference, but in a case where the transmission power difference between the adjacent carriers is increasing, and also where the transmission power difference between the adjacent carriers exceeds the threshold set on the basis of the maximum transmission power difference.

Here, there may be a case where a transmission power of the carrier temporarily increases through the open loop control or the closed loop control, as a result of deterioration of reception quality due to effect of fading or the like. In such a case, even if the transmission power difference between the adjacent carriers temporarily exceeds a threshold set on the basis of a maximum transmission power difference, the transmission power difference between the adjacent carriers is likely to fall within the maximum transmission power difference when the effect of fading or the like is eliminated.

In the second embodiment of the present invention, it is possible to prevent unnecessary intermittent transmission from being performed in the aforementioned case where a transmission power difference between adjacent carriers temporarily exceeds a threshold set on the basis of a maximum transmission power difference.

Third Embodiment

A third embodiment of the present invention will be described hereinafter. In the following description, differences between the aforementioned first embodiment and the third embodiment will be mainly described.

Specifically, in the first embodiment described above, the radio base station 100 determines whether or not to provide an instruction to transmit reverse link data by use of divided time frames in a manner that transmissions of reverse link data using adjacent carriers do not overlap with each other on the time axis (in other words, to transmit reverse link data with adjacent carriers by use of the intermittent transmission).

Different from this, in the third embodiment, the base station controller 200 determines whether or not to provide an instruction to transmit reverse link data with adjacent carriers by use of the intermittent transmission. Then, the base station controller 200 instructs the radio communication terminal 10 via the radio base station 100 to transmit reverse link data by use of the intermittent transmission.

(Configuration of Base Station Controller)

Figure 12:
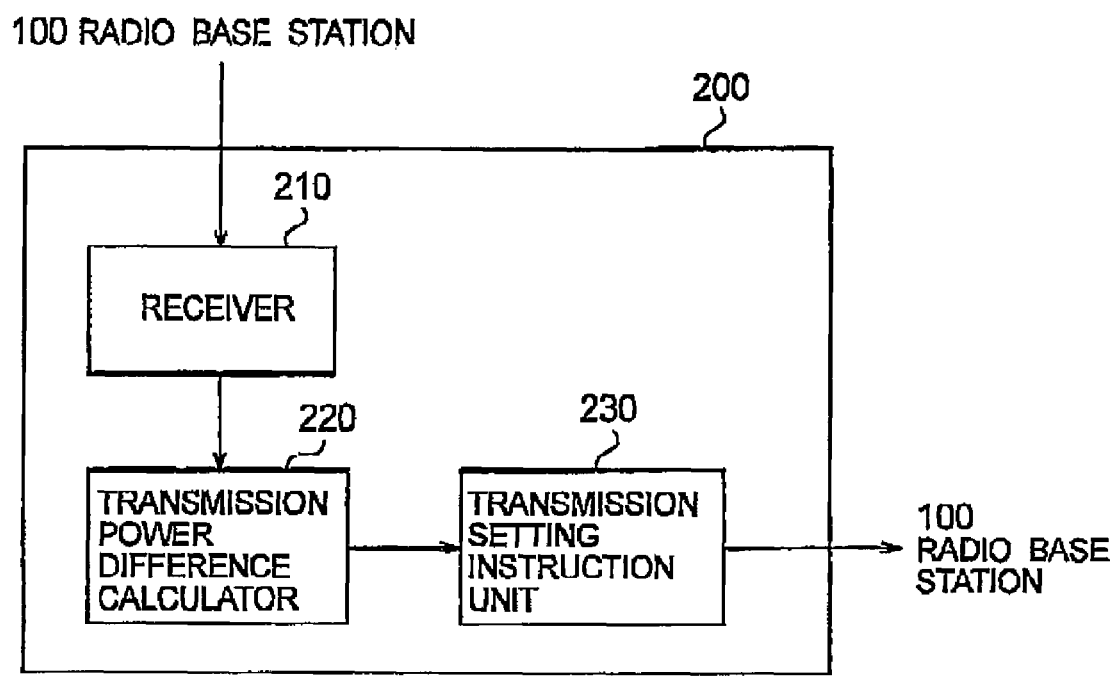
FIG. 12 is a functional block configuration diagram of a base station controller 200 according to a third embodiment of the present invention.

A configuration of a base station controller according to the third embodiment of the present invention will be described hereinafter with reference to the drawings. FIG. 12 is a functional block configuration diagram showing the base station controller 200 according to the third embodiment of the present invention.

As shown in FIG. 12, the base station controller 200 includes a transmission power information receiver 210, a transmission power difference calculator 220 and a transmission setting instruction unit 230.

The transmission power information receiver 210 receives transmission power information (transmission power value) each indicating a transmission power of one of adjacent carriers (reverse link data) from the radio base station 100.

For example, citing a case where a radio communication terminal 10 is connected to the radio base station 100a by use of the carrier #1 while being connected to the radio base station 100b by use of the carrier #2, the transmission power information receiver 210 receives transmission power information indicating a transmission power of the carrier #1 from the radio base station 100a, and receives transmission power information indicating a transmission power of the carrier #2 from the radio base station 100b.

Note that the transmission power information receiver 210 may collectively receive transmission power information indicating the transmission powers of the carrier #1 and the carrier #2, respectively, from the radio base station 100a. Likewise, the transmission power information receiver 210 may collectively receive transmission power information indicating the transmission powers of the carrier #1 and the carrier #2, respectively, from the radio base station 100b.

The transmission power difference calculator 220 calculates a difference between transmission powers of the adjacent carriers on the basis of the transmission power information (transmission power value) received by the transmission power information receiver 210 (hereinafter referred to as a transmission power difference). In addition, the transmission power difference calculator 220 determines whether or not a transmission power difference between the adjacent carriers exceeds a threshold set on the basis of a maximum transmission power difference (MaxRLTxPwrDiff) allowable between the adjacent carriers. Note that when the transmission power difference between the adjacent carriers exceeds the threshold set on the basis of the maximum transmission power difference, the transmission power difference calculator 220 notifies the transmission setting instruction unit 230 that the transmission power difference between the adjacent carriers exceeds the threshold set on the basis of the maximum transmission power difference.

When notified that the transmission power difference between the adjacent carriers exceeds the threshold set on the basis of the maximum transmission power difference, the transmission setting instruction unit 230 instructs the radio communication terminal 10 via the radio base station 100 to transmit reverse link data with the adjacent carriers by use of the intermittent transmission.

(Action and Effect)

with the base station controller 200 according to the third embodiment of the present invention, when notified that a transmission power difference between adjacent carriers exceeds a threshold set on the basis of a maximum transmission power difference, the transmission setting instruction unit 230 provides an instruction to transmit reverse link data by use of divided time frames in a manner that transmissions of reverse link data using the adjacent carriers do not overlap with each other on the time axis (in other words, to transmit reverse link data with the adjacent carriers by use of the intermittent transmission).

Thus, communications by multicarrier can be maintained while interference between adjacent which are adjacent to each other with a predetermined frequency interval is controlled.

Moreover, even in a case where the radio base station 100 connected to the radio communication terminal 10 via one of adjacent carriers and the radio base station 100 connected to the radio communication terminal 10 via the other one of the adjacent carriers are different, the base station controller 200 instructs the radio communication terminal 10 via each of the radio base stations 100 to transmit reverse link data with the adjacent carriers by use of the intermittent transmission. Thus, communications by multicarrier can be maintained while interference between adjacent carriers is controlled.

Fourth Embodiment

A fourth embodiment of the present invention will be described hereinafter. In the following description, differences between the aforementioned first embodiment and the fourth embodiment will be mainly described.

Specifically, in the first embodiment described above, the radio base station 100 instructs a radio communication terminal 10 to transmit reverse link data by use of divided time frames in a manner that transmissions of reverse link data by using adjacent carriers do not overlap with each other on the time axis (in other words, to transmit, reverse link data with adjacent carriers by use of the intermittent transmission), in a case where a transmission power difference between the adjacent carriers exceeds a threshold set on the basis of a maximum transmission power difference.

Different from this, in the fourth embodiment, when a transmission power difference between adjacent carriers exceeds a threshold set on the basis of a maximum transmission power difference, the radio base station 100 instructs the radio communication terminal 10 to stop transmission of reverse link data by using one of adjacent carriers that has a larger transmission power for a predetermined period until the transmission power difference between the adjacent carriers decreases to a value not greater than the threshold set on the basis of the maximum transmission power difference.

(Operation of Radio Base Station)

Figure 13:
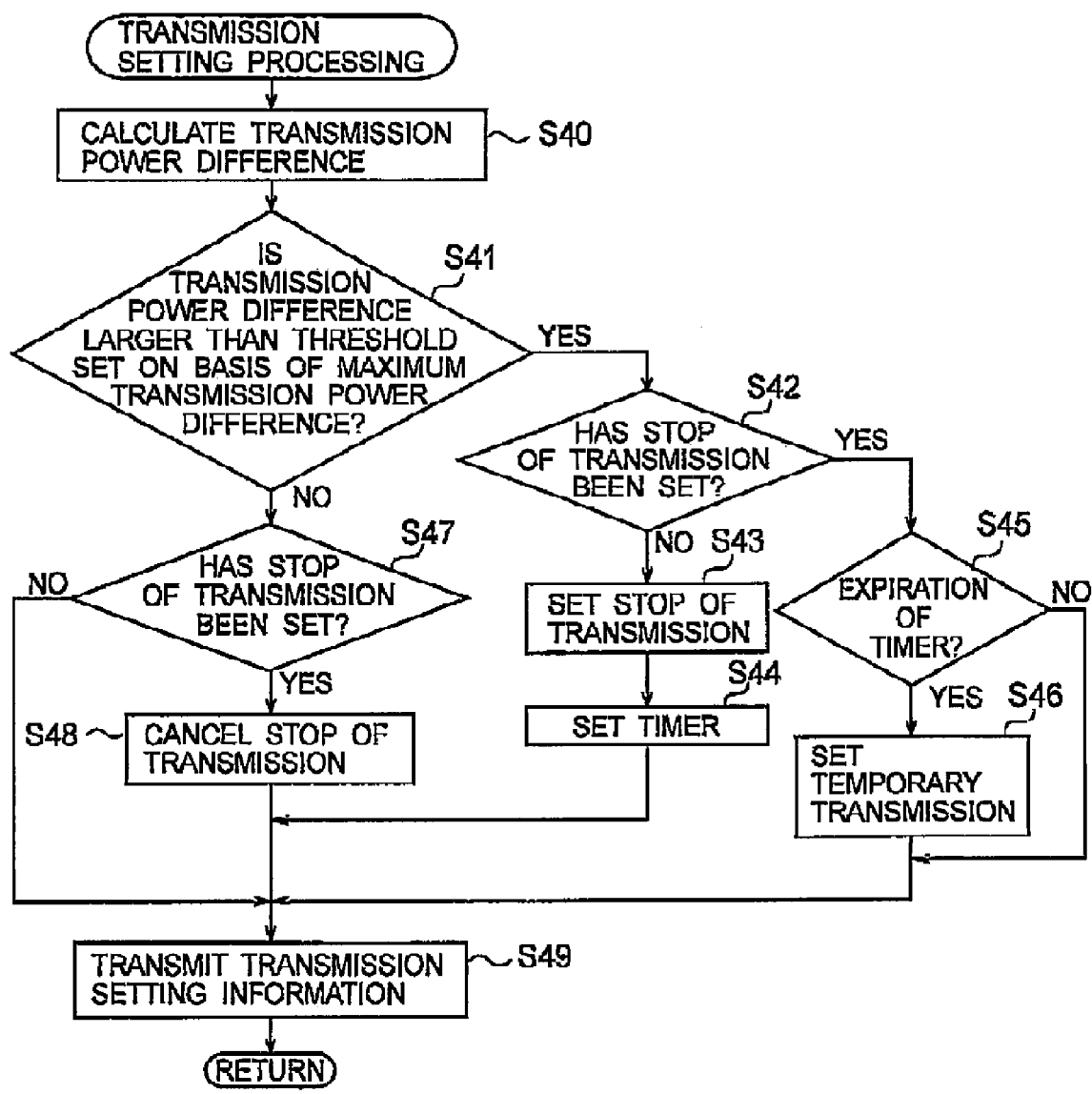
FIG. 13 is a flowchart showing operation of a radio base station 100 according to a fourth embodiment of the present invention.

The operation of the radio base station according to the fourth embodiment of the present invention will be described hereinafter with reference to the drawings. FIG. 13 is a flowchart showing the operation of the radio base station 100 according to the fourth embodiment of the present invention. Note that the transmission setting processing shown in FIG. 13 is performed instead of the aforementioned transmission setting processing shown in FIG. 8.

As shown in FIG. 13, in step 40, the radio base station 100 calculates a difference between transmission powers of reverse link data (transmission power difference) for the adjacent carriers (the carrier #1 and the carrier #2).

In step 41, the radio base station 100 determines whether or not the transmission power difference between the adjacent carriers exceeds a threshold set on the basis of a maximum transmission power difference (MaxRLTxPwrDiff). The radio base station 100 proceeds to the processing of step 42 when the transmission power difference between the adjacent carriers exceeds the threshold set on the basis of the maximum transmission power difference. Moreover, when the transmission power difference between the adjacent carriers does not exceed the threshold set on the basis of the maximum transmission power difference, the radio base station 100 moves to the processing of step 47.

Here, as described previously, the threshold to be set on the basis of a maximum transmission power difference may be equal to the maximum transmission power difference, or may be a value smaller than the maximum transmission power difference (such as a value obtained by multiplying the maximum transmission power difference by a predetermined ratio (0.9)).

In step 42, the radio base station 100 determines whether or not the radio communication terminal 10 has been instructed to stop transmission of reveres link data using one of the carriers that has a larger transmission power (in other words, whether or not the radio communication terminal 10 is set to stop the transmission). In a case where the radio communication terminal 10 is set to stop the transmission, the radio base station 100 moves to the processing of step 45. On the other hand, in a case where the radio communication terminal 10 is not set to stop the transmission, the radio base station 100 moves to the processing of step 43.

In step 43, the radio base station 100 generates transmission setting information to provide an instruction to stop transmission of reverse link data using the one of the carriers that has a larger transmission power.

In step 44, the radio base station 100 sets a timer to a predetermined wait time. Here, the predetermined wait time is a period of time shorter than a period of non-communication time used for the radio base station 100 to determine whether or not to provide an instruction to disconnect a carrier to the radio communication terminal 10, and also, is a period of time allowable to maintain one of carriers that has a larger transmission power. Note that disconnecting of a carrier refers to the stop of transmission with the carrier.

In step 45, the radio base station 100 determines whether or not the predetermined period of time set on the timer has passed. In a case where the predetermined period of time set on the timer has passed, the radio base station 100 moves to the processing of step 46. On the other hand, in a case where the predetermined period of time set with the timer has not passed, the radio base station 100 moves to the processing of step 49.

In step 46, the radio base station 100 generates transmission setting information to provide an instruction to temporarily transmit reverse link data using the one of the carriers that has a larger transmission power. Note that the temporary transmission is to transmit reverse link data that requires a short transmission time in order to maintain the one of the adjacent carriers that has a larger transmission power, in addition, when providing an instruction for temporary transmission, the radio base station 100 also instructs the radio communication terminal 10 to transmit the reverse link data with a transmission power not causing the transmission power difference between the adjacent carriers to exceed the maximum transmission power difference.

In step 47, the radio base station 100 determines whether or not the radio communication terminal 10 has been instructed to stop transmission of reverse link data using one of adjacent carriers that has a larger transmission power (that is, the radio communication terminal 10 is set to stop transmission or not). In a case where the radio communication terminal 10 is set to stop the transmission, the radio base station 100 moves to the processing of step 48. On the other hand, in a case where the radio communication terminal 10 is not set to stop the transmission, the radio base, station 100 moves to the processing of step 49.

In step 48, the radio base station 100 generates transmission setting information to provide an instruction to cancel the stop of the transmission of reverse link data using the one of the carriers that has a larger transmission power.

In step 49, the radio base station 100 transmits transmission setting information generated in one of steps 43, 46 and 48 to the radio communication terminal 10.

Note that when the stop of transmission of reverse link data is not canceled during a predetermined period of time, that is, when the transmission power difference between the adjacent carriers does not decrease to a value equal to or less than the threshold set on the basis of the maximum transmission power difference after elapse of predetermined period, the radio base station 100 instructs the radio communication terminal 10 to disconnect the one of the adjacent carriers that has a larger transmission power.

(Action and Effect)

With the radio base station 100 according to the fourth embodiment of the present invention, when a transmission power difference between adjacent carriers exceeds a threshold set on the basis of a maximum transmission power difference, the radio base station 100 instructs the radio communication terminal 10 to stop transmission of reverse link data using one of adjacent carriers that has a larger transmission power for a predetermined period until the transmission power difference between the adjacent carriers decreases to a value not greater than the threshold set on the basis of the maximum transmission power difference.

Thus, communications by multicarrier can be maintained while interference between adjacent carriers which are adjacent to each other with a predetermined frequency interval is controlled.

In addition, even in a case where the radio base station 100 provides an instruction to stop transmission of reverse link data using one of adjacent carriers that has a larger transmission, the radio base station 100 provides an instruction for temporary transmission of the reverse link data when a period of time set on a timer passes.

Thus, it is possible to suppress disconnection of one of carriers that has a larger transmission power.

Other Embodiments

As described above, content of the present invention was disclosed through an embodiment of the present invention. However, it should not be construed that the description and drawings constituting a part of this disclosure will limit the present invention. Various alternative embodiments will be apparent to those skilled in the art from this disclosure.

For example, in the aforementioned first to fourth embodiments, an instruction to transmit reverse link data by use of divided time frames in a manner that transmissions of reverse link data using adjacent carriers do not overlap with each other on the time axis (in other words, to transmit reverse link data with adjacent carriers by use of the intermittent transmission) is provided on the basis of determination as to whether or not a transmission power difference between adjacent carriers exceeds a threshold set on the basis of a maximum transmission power difference. However, the present invention is not limited to this.

Specifically, the instruction to transmit reverse link data with two carriers that are not adjacent to each other by use of the intermittent transmission may be provided on the basis of determination as to whether or not a transmission power difference between two carriers exceeds a threshold set on the basis of a maximum transmission power difference.

In this case, a predetermined threshold is defined in accordance with the distance between the center frequencies of the two carriers being apart from each other. Specifically, as the center frequencies of the two carriers are apart from each other farther, the two carriers interfere with each other to a lower extent. Thus, the predetermined threshold is defined at a low value.

In addition, the operation of the radio base station 100 according to the aforementioned first, second and fourth embodiments can be provided as a program executable on a computer.

Moreover, although it is not particularly mentioned in the first to fourth embodiments described above, transmission setting information to provide an instruction for the intermittent transmission may be information indicating the number of slots to stop transmission of reverse link data using one of adjacent carriers that has a larger transmission power. Note that transmission of reverse link data using one of carriers that has a smaller transmission power is performed in a slot in which transmission of reverse link data using a carrier having a larger transmission power is stopped.

In this case, it is preferable that the larger the transmission power difference between adjacent carriers, the larger the number of slots to stop transmission of reverse link data using a carrier having a larger transmission power be act.

Moreover, it is possible to suppress interference between carriers or radio communication terminals by causing aforementioned intermittent transmission to be in synchronization among multiple radio communication terminals covered by the some radio base station, and transmission power difference between adjacent, carriers exceeds a threshold set on the basis of a maximum transmission power difference.

In addition, by causing the aforementioned intermittent transmission to be in synchronization between multiple radio base stations adjacent to each other with respect to radio communication terminals respectively covered by the multiple radio base stations, interference of carriers between radio communication terminals across the control areas of radio base stations can be suppressed.

As described, the present invention contains various embodiments that have not been described herein, as a matter of course. Thus, a technical scope of the present invention shall be defined only by inventive specific matters according to the claims that are reasonable from the above description.

Note that the entire contents of Japanese Patent Application No. 2006-233803 (filed on Aug. 30, 2006) are incorporated herein by reference in this description.

INDUSTRIAL APPLICABILITY

As described above, the radio communication method and the radio base station according to the present invention can maintain communication by multicarrier while controlling interference between adjacent carries that are adjacent to each other with a predetermined frequency interval. Accordingly, they are useful in radio communications such as mobile communications.

The invention claimed is:

1. A radio communication method in reverse link by multicarrier using at least a first carrier and a second carrier that is adjacent to the first carrier with a predetermined frequency interval, the method comprising the steps of:
   acquiring a reverse link transmission power value of the first carrier from a radio communication terminal connected via the first carrier;
   acquiring a reverse link transmission power value of the second carrier from a radio communication terminal connected via the second carrier;

calculating a transmission power difference between the reverse link transmission power values of the first carrier and the second carrier;

determining whether the transmission power difference exceeds a threshold set on the basis of a maximum transmission power difference allowable between the first carrier and the second carrier;

assigning a first time frame used for transmitting reverse link data by using the first carrier and a second time frame used for transmitting reverse link data by using the second carrier in a manner that the two time frames do not overlap with each other on a time axis, in a case where the transmission power difference exceeds the threshold set on the basis of the maximum transmission power difference;

notifying the radio communication terminal connected via the first carrier, of the first time frame; and notifying the radio communication terminal connected via the second carrier, of the second time frame.

2. The radio communication method according to claim 1, wherein the transmission power difference is calculated in a predetermined cycle in the step of calculating the transmission power difference, the method further comprising the step of determining whether the transmission power difference is increasing, on the basis of the transmission power differences calculated in the predetermined cycle, wherein in the step of assigning the first time frame and the second time frame, the first and second time frames are assigned in a manner that the two time frames do not overlap with each other on the time axis, in a case where the transmission power difference is determined as increasing.

3. A radio base station connected to a radio communication terminal by multicarrier using at least a first carrier and a second carrier that is adjacent to the first carrier with a predetermined frequency interval, the radio base station comprising:

an acquisition unit configured to acquire a reverse link transmission power value of the first carrier from a radio communication terminal connected via the first carrier and a reverse link transmission power value of the second carrier from a radio communication terminal connected via the second carrier;

a transmission power difference calculator configured to calculate a transmission power difference between the reverse link transmission power values of the first carrier and the second carrier;

a transmission power difference determination unit configured to determine whether the transmission power difference calculated by the transmission power difference calculator exceeds a threshold set on the basis of a maximum transmission power difference allowable between the first carrier and the second carrier;

an assignment unit configured to assign a first time frame used for transmitting reverse link data by using the first carrier and a second time frame used for transmitting reverse link data by using the second carrier in a manner that the two time frames do not overlap with each other on the time axis, in a case where the transmission power difference determination unit determines that the transmission power difference exceeds the threshold set on the basis of the maximum transmission power difference; and a notification unit configured to notify the radio communication terminal connected via the first carrier of the first time frame and the radio communication terminal connected via the second carrier of the second time frame.

4. The radio base station according to claim 3, wherein the transmission power difference calculator calculates the transmission power difference in a predetermined cycle, the radio base station further comprising a power difference tendency determination unit configured to determine whether the transmission power difference is increasing, on the basis of the transmission power differences calculated by the transmission power difference calculator in the predetermined cycle, wherein the assignment unit assigns the first time frame and the second time frame in a manner that the two time frames do not overlap with each other on the time axis, in a case where the power difference tendency determination unit determines that the transmission power difference is increasing.

* * * * *